United States Patent
Zhou et al.

(10) Patent No.: US 12,432,577 B2
(45) Date of Patent: Sep. 30, 2025

(54) GROUP CONFIGURATION FOR INTER-CELL MOBILITY IN MULTI-TRANSMISSION RECEPTION POINT DEPLOYMENTS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 17/865,783

(22) Filed: Jul. 15, 2022

(65) Prior Publication Data
US 2024/0022924 A1 Jan. 18, 2024

(51) Int. Cl.
*H04W 24/02* (2009.01)
*H04W 16/18* (2009.01)

(52) U.S. Cl.
CPC .......... *H04W 24/02* (2013.01); *H04W 16/18* (2013.01)

(58) Field of Classification Search
None
See application file for complete search history.

(56) References Cited

U.S. PATENT DOCUMENTS

| | | | |
|---|---|---|---|
| 2016/0212662 A1* | 7/2016 | Lee | H04W 36/04 |
| 2023/0007499 A1* | 1/2023 | Da Silva | H04W 24/02 |

OTHER PUBLICATIONS

International Search Report and Written Opinion—PCT/US2023/068674—ISA/EPO—Oct. 9, 2023.
Mediatek: "Moderator's Summary of Discussion for [94e-14-R18-MobEnh]", 3GPP TSG RAN Meeting #94-e, RP-213541, 3rd Generation Partnership Project, Mobile Competence Centre, 650, Route Des Lucioles, F-06921 Sophia-Antipolis Cedex, France, vol. RAN WG3, No. Electronic Meeting, Dec. 6, 2021-Dec. 17, 2021, Dec. 10, 2021, pp. 1-70, XP052097608, p. 3-p. 11, p. 31-p. 38, p. 52-p. 66.

(Continued)

*Primary Examiner* — Jamaal Henson
(74) *Attorney, Agent, or Firm* — Holland & Hart LLP/Qualcomm Incorporated

(57) ABSTRACT

Methods, systems, and devices for wireless communications are described. A network entity may configure one or more user equipments (UEs) with cell group configuration information for a single cell group or multiple cell groups. The configuration information may include parameters for each cell in the one or more cell groups. The configuration information may include a set of parameters for multiple candidate roles for each cell in the cell group. The network may then dynamically switch, update, or activate, cell groups, and may dynamically switch transmission reception points (TRPs) in a cell group from one role to another via dynamic signaling (e.g., level 1 (L1) or level 2 (L2) signaling). Additionally, or alternatively, the network may activate, deactivate, add, or remove, individual cells or cell groups from a set of configured cells via L1 or L2 signaling.

20 Claims, 15 Drawing Sheets

(56) References Cited

OTHER PUBLICATIONS

Qualcomm Incorporated: "Discussion on L1/L2 Mobility", 3GPP TSG-RAN WG2 Meeting #113-bis-e, Electronic, Apr. 12-Apr. 20, 2021, R2-2103079, 3rd Generation Partnership Project, Mobile Competence Centre, 650, Route Des Lucioles, F-06921, Sophia-Antipolis Cedex, France, vol. RAN WG2, No. Electronic, Apr. 2, 2021, 6 Pages, XP052174591, p. 1-p. 6.

Qualcomm Incorporated: "L1/L2 Mobility—General Concepts and Configuration", 3GPP TSG-RAN WG2 Meeting #119-e Electronic, Aug. 15-Aug. 26, 2022, R2-2207340, 3rd Generation Partnership Project, Mobile Competence Centre, 650, Route Des Lucioles, F-06921 Sophia-Antipolis Cedex, France, vol. Ran WG2, vol. RAN WG2, No. Electronic, Aug. 8, 2022, 6 Pages, XP052260662, p. 1-p. 6.

Qualcomm Incorporated: "L1/L2 Mobility Considerations", 3GPP TSG-RAN WG2 Meeting #119-bis-e Electronic, Oct. 10-Oct. 19, 2022, R2-2209701, 3rd Generation Partnership Project, Mobile Competence Centre, 650, Route Des Lucioles, F-06921 Sophia-Antipolis Cedex, France, vol. RAN WG2, Sep. 30, 2022, 6 Pages, XP052263028, p. 1-p. 6.

Zte, et al., "Discussion on Rel-18 Mobility enhancement", 3GPP TSG-RAN#94e Electronic Meeting, Dec. 6-17, 2021, RP-213463, 3rd Generation Partnership Project, Mobile Competence Centre, 650, Route Des Lucioles, F-06921 Sophia-Antipolis Cedex, France, vol. RAN WG1, 5 Pages, XP052097551, Nov. 29, 2021, p. 1-p. 5.

* cited by examiner

GROUP CONFIGURATION FOR INTER-CELL MOBILITY IN MULTI-TRANSMISSION RECEPTION POINT DEPLOYMENTS

FIELD OF TECHNOLOGY

The following relates to wireless communications, including group configuration for inter-cell mobility in multi-transmission reception point (mTRP) deployments.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support group configuration for inter-cell mobility in multi-transmission reception point (mTRP) deployments. For example, a network may configure one or more user equipments (UEs) with cell group configuration information for a single cell group or multiple cell groups. The configuration information may include parameters for each cell in the one or more cell groups. The configuration information may include a set of parameters for each candidate role for each cell in the cell group. Because each cell in the cell group has been configured with multiple candidate roles and parameters for each candidate roll, the network may then dynamically switch, update, or activate, cell groups, and may dynamically switch transmission reception points (TRPs) in a cell group from one role to another via dynamic signaling (e.g., level 1 (L1) or level 2 (L2) signaling, such as media access control (MAC) control element (CE), or downlink control information (DCI) signaling). Additionally, or alternatively, the network may activate or deactivate individual cells or cell groups via dynamic signaling (e.g., L1 or L2 signaling). In some cases, the network may also remove cells from cell groups or remove cell groups from a set of cell groups.

A method for wireless communications at a UE is described. The method may include receiving radio resource control (RRC) signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a multi-TRP deployment, receiving control signaling that indicates an activation status for one or more of the set of multiple cells in the cell group, an indication of an operative role for each of the set of multiple cells in the cell group from among the set of candidate roles, or a combination thereof, and performing wireless communications with the set of multiple cells in the cell group according to the operative roles for the set of multiple cells in the cell group in the multi-TRP deployment.

An apparatus for wireless communications is described. The apparatus may include memory, a transceiver, and at least one processor of a UE, the at least one processor coupled with the memory and the transceiver. The instructions may be executable by the processor to cause the apparatus to receive RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a multi-TRP deployment, receive control signaling that indicates an activation status for one or more of the set of multiple cells in the cell group, an indication of an operative role for each of the set of multiple cells in the cell group from among the set of candidate roles, or a combination thereof, and perform wireless communications with the set of multiple cells in the cell group according to the operative roles for the set of multiple cells in the cell group in the multi-TRP deployment.

Another apparatus for wireless communications at a UE is described. The apparatus may include means for receiving RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a multi-TRP deployment, means for receiving control signaling that indicates an activation status for one or more of the set of multiple cells in the cell group, an indication of an operative role for each of the set of multiple cells in the cell group from among the set of candidate roles, or a combination thereof, and means for performing wireless communications with the set of multiple cells in the cell group according to the operative roles for the set of multiple cells in the cell group in the multi-TRP deployment.

A non-transitory computer-readable medium storing code for wireless communications at a UE is described. The code may include instructions executable by a processor to receive RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a multi-TRP deployment, receive control signaling that indicates an activation status for one or more of the set of multiple cells in the cell group, an indication of an operative role for each of the set of multiple cells in the cell group from among the set of candidate roles, or a combination thereof, and perform wireless communications with the set of multiple cells in the cell group according to the operative roles for the set of multiple cells in the cell group in the multi-TRP deployment.

Some examples of the method, apparatuses, and non-transitory computer-readable medium described herein may further include operations, features, means, or instructions for receiving, in the RRC signaling, second cell group configuration information for a second set of multiple cells in a second cell group associated with a second serving cell, the second cell group configuration information including, for each cell in the second cell group, multiple corresponding sets of parameters including a respective set of parameters for each candidate role of the set of candidate roles associated with the multi-TRP deployment.

Some examples of the method, apparatuses, and non-transitory computer-readable medium described herein may further include operations, features, means, or instructions for transmitting capability information indicating that the UE may be capable of supporting a set of multiple cell groups, where receiving the cell group configuration information for the set of multiple cells in the cell group and receiving the cell group configuration information for the second set of multiple cells in the second cell group may be based on transmitting the capability information.

Some examples of the method, apparatuses, and non-transitory computer-readable medium described herein may further include operations, features, means, or instructions for receiving, in the control signaling, an instruction to switch from communicating with a second cell group including a second set of multiple cells to communicating with the set of multiple cells in the cell group, where performing wireless communications with the set of multiple cells in the cell group may be based on receiving the instruction to switch.

In some examples of the method, apparatuses, and non-transitory computer-readable medium described herein, the cell group configuration information including, for each cell in the cell group, multiple corresponding sets of parameters may include operations, features, means, or instructions for a first set of multiple sets of parameters for a first cell of the set of multiple cells and a set of offsets associated with the first set of multiple sets of parameters, where a second set of multiple sets of parameters for a second cell of the set of multiple cells may be based on application of the set of offsets to the first set of multiple sets of parameters.

Some examples of the method, apparatuses, and non-transitory computer-readable medium described herein may further include operations, features, means, or instructions for receiving RRC signaling that removes the cell group from a set of multiple cell groups including at least one active cell group and at least one inactive cell group.

In some examples of the method, apparatuses, and non-transitory computer-readable medium described herein, for each cell in the cell group, the respective set of parameters for each candidate role of the set of candidate roles may include a first set of parameters for a first candidate role including a primary TRP role and a second set of parameters for a second candidate role including a secondary TRP role.

In some examples of the method, apparatuses, and non-transitory computer-readable medium described herein, each cell of the set of multiple cells may be associated with a TRP of a set of multiple TRPs.

In some examples of the method, apparatuses, and non-transitory computer-readable medium described herein, receiving the control signaling may include operations, features, means, or instructions for receiving a downlink control information (DCI) message or a media access control (MAC) control element (CE) that indicates an activation status for one or more of the set of multiple cells in the cell group, an indication of an operative role for each of the set of multiple cells in the cell group from among the set of candidate roles, or a combination thereof.

A method for wireless communications at one or more network entities is described. The method may include outputting RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a multi-TRP deployment, outputting control signaling that indicates an activation status for one or more of the set of multiple cells in the cell group, an indication of an operative role for each of the set of multiple cells in the cell group from among the set of candidate roles, or a combination thereof, and performing wireless communications with one or more UEs according to the operative roles for the set of multiple cells in the cell group in the multi-TRP deployment.

An apparatus for wireless communications is described. The apparatus may include memory and at least one processor of a network entity, the at least one processor coupled with the memory. The at least one processor may be configured to output RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a multi-TRP deployment, output control signaling that indicates an activation status for one or more of the set of multiple cells in the cell group, an indication of an operative role for each of the set of multiple cells in the cell group from among the set of candidate roles, or a combination thereof, and perform wireless communications with one or more UEs according to the operative roles for the set of multiple cells in the cell group in the multi-TRP deployment.

Another apparatus for wireless communications at one or more network entities is described. The apparatus may include means for outputting RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a multi-TRP deployment, means for outputting control signaling that indicates an activation status for one or more of the set of multiple cells in the cell group, an indication of an operative role for each of the set of multiple cells in the cell group from among the set of candidate roles, or a combination thereof, and means for performing wireless communications with one or more UEs according to the operative roles for the set of multiple cells in the cell group in the multi-TRP deployment.

A non-transitory computer-readable medium storing code for wireless communications at one or more network entities is described. The code may include instructions executable by a processor to output RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a multi-TRP deployment, output control signaling that indicates an activation status for one or more of the set of multiple cells in the cell group, an indication of an operative role for each of the set of multiple cells in the cell group from among the set of candidate roles, or a combination thereof, and perform wireless communications with one or more UEs according to the operative roles for the set of multiple cells in the cell group in the multi-TRP deployment.

Some examples of the method, apparatuses, and non-transitory computer-readable medium described herein may further include operations, features, means, or instructions for outputting, in the RRC signaling, second cell group configuration information for a second set of multiple cells in a second cell group associated with a second serving cell, the second cell group configuration information including, for each cell in the second cell group, multiple corresponding sets of parameters including a respective set of parameters for each candidate role of the set of candidate roles associated with the multi-TRP deployment.

Some examples of the method, apparatuses, and non-transitory computer-readable medium described herein may further include operations, features, means, or instructions for obtaining capability information indicating that a UE of the one or more UEs may be capable of supporting a set of multiple cell groups, where outputting the cell group configuration information for the set of multiple cells in the cell group and outputting the cell group configuration information for the second set of multiple cells in the second cell group may be based on transmitting the capability information.

Some examples of the method, apparatuses, and non-transitory computer-readable medium described herein may further include operations, features, means, or instructions for outputting, in the control signaling, an instruction to switch from communicating with a second cell group including a second set of multiple cells to communicating with the set of multiple cells in the cell group, where performing wireless communications with the one or more UEs may be based on receiving the instruction to switch.

In some examples of the method, apparatuses, and non-transitory computer-readable medium described herein, the cell group configuration information including, for each cell in the cell group, multiple corresponding sets of parameters may include operations, features, means, or instructions for a first set of multiple sets of parameters for a first cell of the set of multiple cells and a set of offsets associated with the first set of multiple sets of parameters, where a second set of multiple sets of parameters for a second cell of the set of multiple cells may be based on application of the set of offsets to the first set of multiple sets of parameters.

Some examples of the method, apparatuses, and non-transitory computer-readable medium described herein may further include operations, features, means, or instructions for outputting RRC signaling that removes the cell group from a set of multiple cell groups including at least one active cell group and at least one inactive cell group.

In some examples of the method, apparatuses, and non-transitory computer-readable medium described herein, for each cell in the cell group, the respective set of parameters for each candidate role of the set of candidate roles may include a first set of parameters for a first candidate role including a primary TRP role and a second set of parameters for a second candidate role including a secondary TRP.

In some examples of the method, apparatuses, and non-transitory computer-readable medium described herein, each cell of the set of multiple cells may be associated with a TRP of a set of multiple TRPs.

In some examples of the method, apparatuses, and non-transitory computer-readable medium described herein, outputting the control signaling may include operations, features, means, or instructions for outputting a DCI message or a MAC-CE that indicates an activation status for one or more of the set of multiple cells in the cell group, an indication of an operative role for each of the set of multiple cells in the cell group from among the set of candidate roles, or a combination thereof.

DETAILED DESCRIPTION

Figure 1:
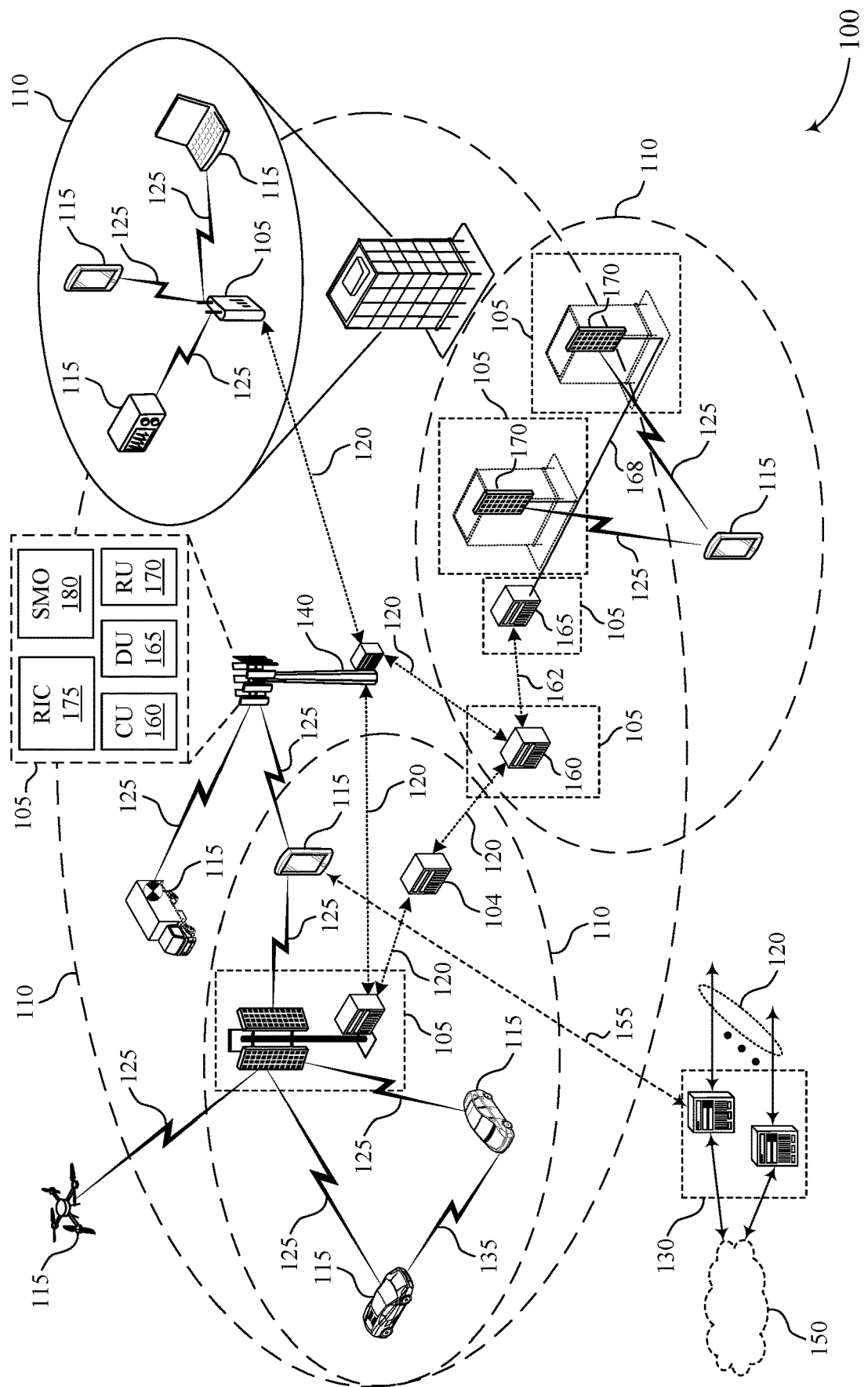
FIG. 1 illustrates an example of a wireless communications system that supports group configuration for inter-cell mobility in multi-transmission reception point (mTRP) deployments in accordance with one or more aspects of the present disclosure.

In some wireless communications systems, a user equipment (UE) may communicate with one or more network entities in a multi-transmission reception (mTRP) deployment. In such examples, a group of one or more cells (e.g., a group of transmission reception points (TRPs)) may serve one or more UEs in a serving area associated with the group of cells. Each cell (e.g., associated with each TRP) may serve in a role associated with the mTRP deployment. For example, one TRP may serve as a primary TRP (pTRP), and one or more additional TRPs in a group of TRPs may serve as an additional TRPs. One or more cells (e.g., a cell group) may be active (e.g., may actively serve one or more UEs), and one or more cells (e.g., one or more additional cells in the cell group or additional cell groups) may be configured at the UEs, but may not be active.

Different cells (e.g., different TRPs) in a cell group may serve in different operative roles. For example, a primary TRP (pTRP) may provide control signaling (e.g., via a primary cell (PCell), and one or more assistant TRPs (aTRPs) may provide additional signaling such as data signaling or may improve throughput in a carrier aggregation scenario (e.g., via one or more secondary cells (SCells) or secondary primary cells (SCells). If a TRP is to change roles (e.g., from pTRP to aTRP or vice versa, or from operating on one CC (e.g., a PCell) to another CC (e.g., an SCell or SpCell), the network may reconfigure the TRPs via higher layer signaling (e.g., level 3 (L3) signaling such as radio resource control (RRC) signaling). However, some UEs may be highly mobile, and changes to active cells, or changes to cell roles, and using RRC signaling to reconfigure cell groups may be too slow to effectively maintain cell coverage, cell group switching, or cell activation and deactivation, resulting in lower quality of wireless communications, decreased coverage, less efficient use of system resources, and decreased user experience A network may configure one or more UEs with cell group configuration information for a single cell group or multiple cell groups. The configuration information may include parameters for each cell in the one or more cell groups. The configuration information may include a set of parameters for each candidate role (e.g., pTRP or aTRP, PCell, SCell, SpCell, etc.) for each cell in the cell group. Because each cell in the cell group has been configured with multiple candidate roles and parameters for each candidate roll, the network may then dynamically switch, update, or activate, cell groups, and may dynamically switch TRPs in a cell group from one role to another via dynamic signaling (e.g., level 1 (L1) or level 2 (L2) signaling, such as media access control (MAC) control element (CE), or downlink control information (DCI) signaling). Additionally, or alternatively, the network may activate or deactivate individual cells or cell groups via dynamic signaling. In some cases, the network may also remove cells from cell groups or remove cell groups from a set of cell groups.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to group configuration for inter-cell mobility in mTRP deployments.

FIG. 1 illustrates an example of a wireless communications system 100 that supports group configuration for inter-cell mobility in mTRP deployments in accordance with one or more aspects of the present disclosure. The wireless communications system 100 may include one or more network entities 105, one or more UEs 115, and a core network 130. In some examples, the wireless communications system 100 may be a Long-Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC signaling, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or IAB node 104 may be referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support group configuration for inter-cell mobility in mTRP deployments as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems may benefit from designs and enhancements of L1 or L2 inter cell mobility. Configuration and maintenance for multiple candidate cells may support fast application of configurations for candidate cells. Dynamic switching mechanisms among candidate serving cells (e.g., including SpCells and SCells), may be applicable based on L1 or L2 signaling. L1 signaling for inter-cell beam management, including L1 measurements and reporting and beam indications may support more dynamic and flexible configuration of cells and cell groups. Timing advance management, CU and DU interface signaling to support L1/L2 mobility, etc., may support techniques described herein. Techniques described herein may apply to various frequency ranges, including F1 and F2. Techniques described herein for L1/L2 based inter-cell mobility may be applicable in various scenarios, including standalone deployments, carrier aggregation (CA) scenarios, NR-DC cases with serving cell changes within one carrier group (CG), intra-DU cases and intra-CU inter-DU cases (e.g., applicable for standalone and CA deployments), both intra-frequency and inter-frequency scenarios, both FR1 and FR2, and source and target cells that are synchronized or non-synchronized.

As described herein, a network entity 105 may configure one or more UEs 115 with cell group configuration information (e.g., transmit cell group configuration information to the one or more UEs) for a single cell group or multiple cell groups. The configuration information may include parameters for each cell in the one or more cell groups. The configuration information may include a set of parameters for each candidate role (e.g., pTRP or aTRP, PCell, SCell, SpCell, etc.) for each cell in the cell group. Because each cell in the cell group has been configured with multiple candidate roles and parameters for each candidate roll, the network may then dynamically switch, update, or activate, cell groups, and may dynamically switch TRPs in a cell group from one role to another via dynamic signaling (L1 or L2 signaling, such as MAC-CE or DCI signaling). Additionally, or alternatively, the network may activate or deactivate individual cells or cell groups via dynamic signaling. In some cases, the network may also remove cells from cell groups or remove cell groups from a set of cell groups.

Figure 2:
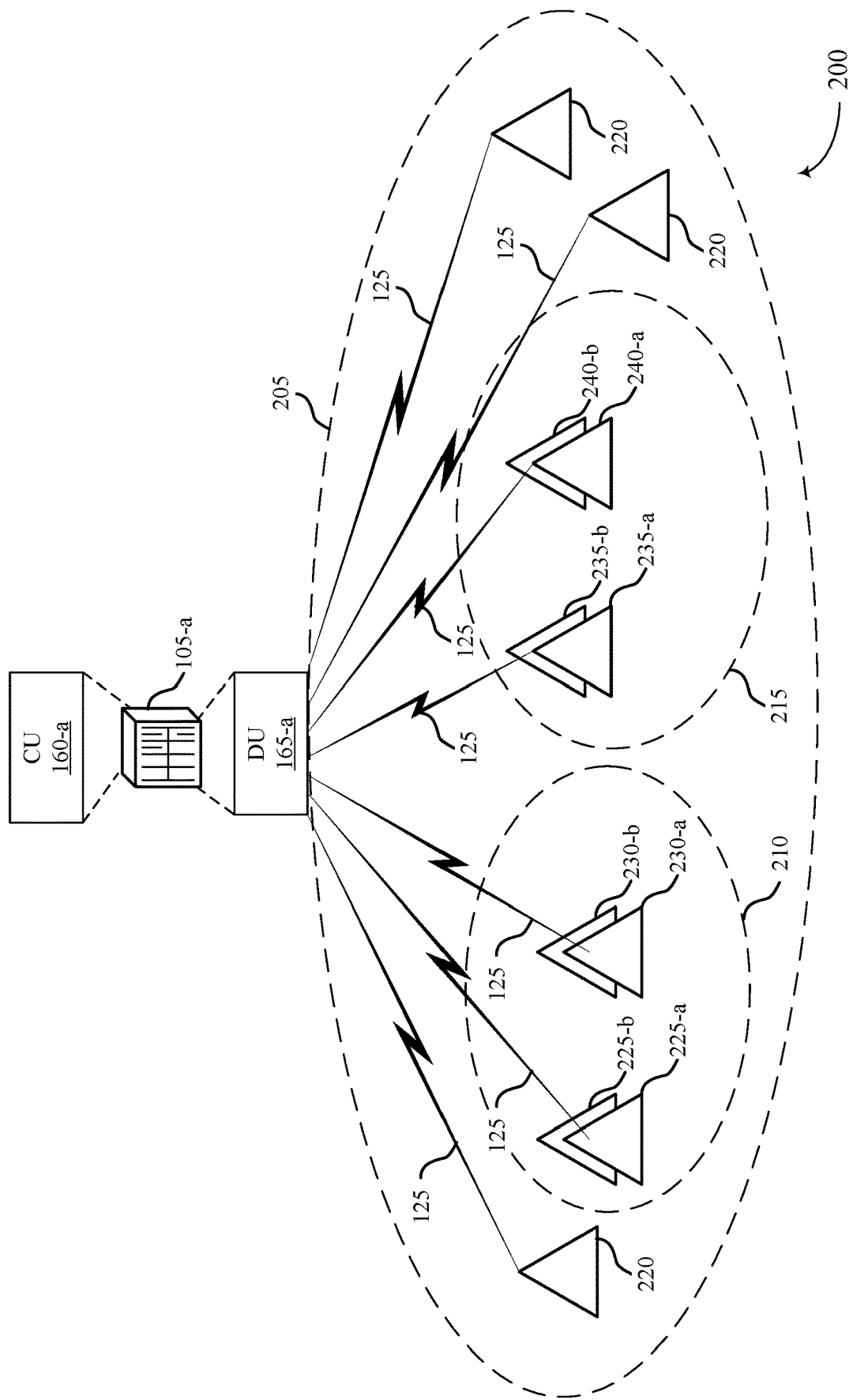
FIG. 2 illustrates an example of a wireless communications system that supports group configuration for inter-cell mobility in mTRP deployments in accordance with one or more aspects of the present disclosure.

FIG. 2 illustrates an example of a wireless communications system 200 that supports group configuration for inter-cell mobility in mTRP deployments in accordance with one or more aspects of the present disclosure. Wireless communications system 200 may implement, or be implemented by, aspects of wireless communications system 100. For example, wireless communications system 200 may include one or more network entities 105 (e.g., the network entity 105-a), which may communicate with one or more wireless devices (e.g., UEs 115 or TRPs) using DU functionality (e.g., via DU 165-a), CU functionality (e.g., via CU 160-a), or both. For instance, the network entity 105-a may communicate with one or more cells (e.g., TRPs) using communication links 125. Such devices (e.g., network entities, UEs, and TRPs) may be examples of corresponding devices described with reference to FIG. 1. Techniques described herein may support RRC configuration of sets of cells for L1 or L2 mobility.

The network entity 105-a may communicate with one or more UEs 115 via one or more cells. In some examples, each cell may be associated with a TRP. Some cells may support one or more carriers in a CA mode. For instance, a cell 225 may support multiple carriers, in which case cell 225-a may represent service by the cell 225 via a first carrier (e.g., a PCell) and cell 225-b may represent service by the cell 225 via a second carrier (e.g., an SCell or a PSCell). Similarly, a cell 230 may serve one or more UEs using multiple carriers (e.g., a first carrier associated with cell 230-a and a second carrier associated with cell 230-b).

In an mTRP deployment, multiple TRPs may communicate with one or more UEs in a serving cell. Each TRP may be considered to be a cell (e.g., a first TRP associated with cell 225, a second TRP associated with cell 230, etc.). In some examples, a group of TRPs may be collocated (e.g., located at a same location or a single device, or to devices located within a threshold distance of each other, among other examples). When a UE switches to a new TRP in a new TRP group, the UE may access all TRPs in the group of TRPs. For each TRP group, one TRP may be a pTRP, and other TRPs may be aTRPs. In some examples, a UE may be served by a first TRP (e.g., cell 235-a via a first carrier and cell 235-b via a second carrier) and a second TRP (e.g., cell 240-a via a first carrier and cell 240-b via a second carrier). An mTRP deployment may increase throughput, support CA scenarios, increase the reliability of wireless communications, and may improve user experience.

In some examples, a UE may be highly mobile (e.g., may move quickly through various coverage areas, and may be able to maintain connectivity with the network by switching from cell to cell). Such a UE may rely on L3 signaling (e.g., RRC signaling) to activate cells, reconfigure cell groups, or change the operative role of TRPs in an mTRP deployment. However, RRC signaling for such changes may not be flexible or dynamic enough to address changes resulting from high mobility, and may result in increased system delays, failed handovers from serving cell to serving cell, time periods without service for one or more UEs, decreased efficiency in use of available system resources, and decreased user experience. More dynamic techniques for updating TRP operative roles, activating or deactivating cells or cell groups, or changing (e.g., adding or removing) cells in a configured cell group, may result in improved user experience, more reliable wireless communications, improved user experience, and more efficient use of system resources.

Techniques described herein may support L1 or L2 signaling to set a TRP cell group based on previously indicated options (e.g., indicated via L3 signaling such as RRC signaling) within an activated cell set (e.g., instead of changing TRP operative roles via L3 signaling). If a TRP is enabled with L1/L2 mobility configurations, as described herein, a TRP operating state may be changed (e.g., an aTRP may be updated to be a pTRP, or a pTRP may be updated to be an aTRP) using L1 or L2 signaling. Such L1 or L2 signaling to update a cell group or change a TRP operative role may be supported by previous L3 signaling. That is, L3 signaling may provide configuration information for a cell set 205 including active cell set 210 and deactivated cell set 215 (e.g., or one or more additional cells 220) via L3 signaling. The configuration information may include configuration information for a set of candidate roles for each cell (e.g., each TRP, including aTRP configuration information and pTRP configuration), configuration for various carriers (e.g., PCell, SCell, SpCell, etc.), or any combination thereof, for each cell. Thus, subsequent L1 or L2 signaling (e.g., MAC-CE or DCI signaling) may activate or deactivate cells, change an active role for a TRP, change the cells in a cell set 205, among other examples, by referring to the previously configured candidate roles or candidate carrier configurations, etc.

In some examples, a set of cells (e.g., a cell group) configured via RRC signaling for L1 or L2 mobility may be referred to as an L1/L2 mobility configured cell set 205. The configured cell set 205 may include an activated cell set 210 (e.g., which may be referred to as an L1/L2 mobility activated cell set), which may include a group of cells in the configured cell set 210 that are activated and can be readily used for data and control transfer (e.g., for communications between the network and one or more UEs 115 served by the activated cell set 210). The configured cell set 205 may also include a deactivated cell set 215 (e.g., which may be referred to as an L1/L2 mobility deactivated cell set), which may include a group of cells in the configured cell set 205 that are deactivated and can be readily activated (e.g., by L1/L2 signaling). As described herein, L1/L2 signaling may be used to activate or deactivate cells in the configured cell set 205, as well as to select beams within each activated cell. Techniques described herein may support seamless mobility within an activated cells in the set. As a UE 115 moves, cells from the cell set 205 may be deactivated or activated by L1 or L2 signaling (e.g., based on signal quality measurements, loading information, among other examples). The network may configure a cell set 205 to have at least threshold number of cells, or to satisfy a threshold amount of physical space (e.g., such that the cell set is large enough to cover meaningful mobility area).

Figure 3:
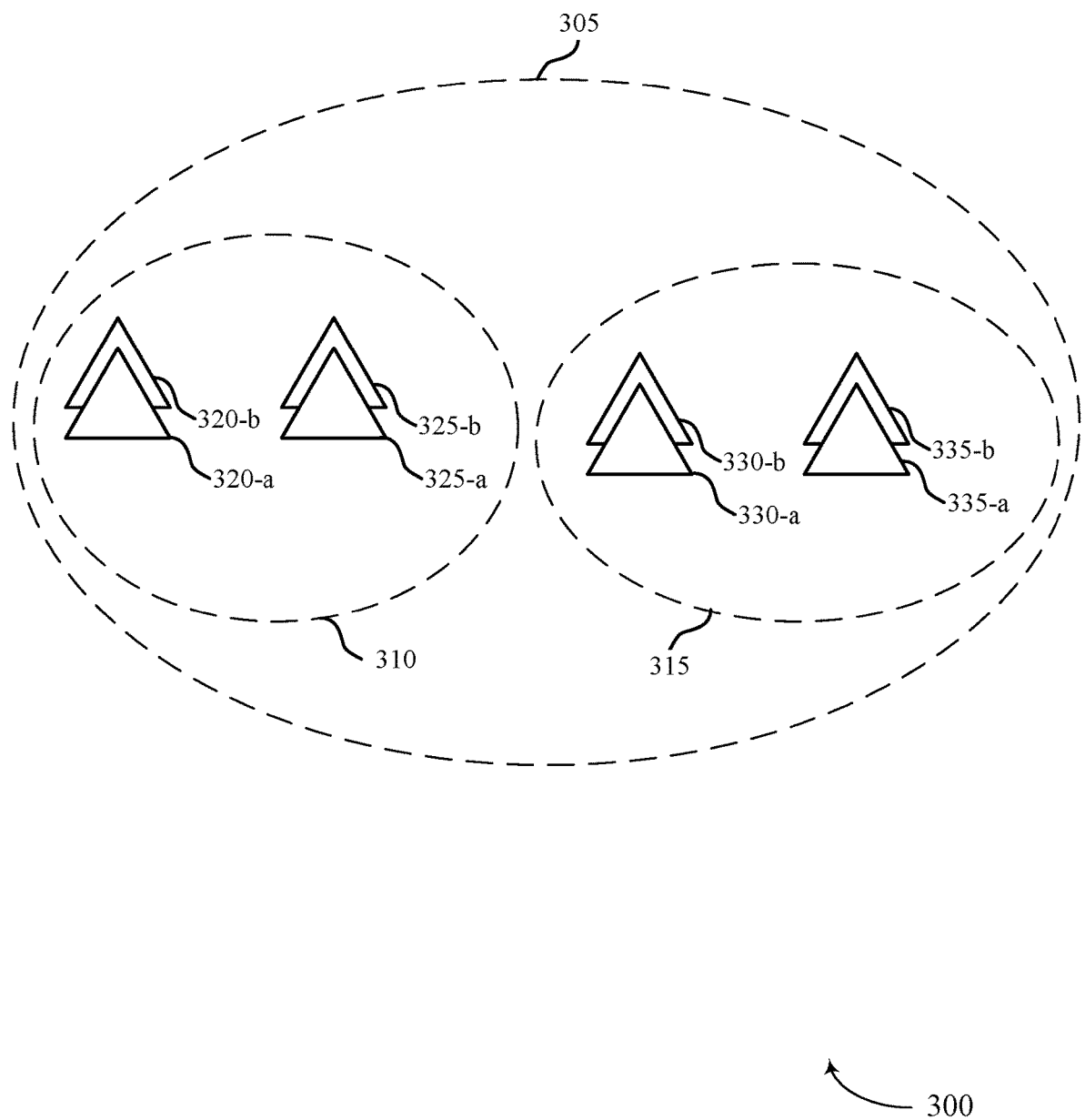
FIG. 3 illustrates an example of a wireless communications system that supports group configuration for inter-cell mobility in mTRP deployments in accordance with one or more aspects of the present disclosure.

FIG. 3 illustrates an example of a wireless communications system 300 that supports group configuration for inter-cell mobility in mTRP deployments in accordance with one or more aspects of the present disclosure. Wireless communications system 300 may implement, or be implemented by, aspects of wireless communications system 100 and wireless communications system 200. For example, the wireless communications system 300 may include one or more network entities, one or more UEs, and one or more TRPs (e.g., associated with one or more cells), any of which may be examples of corresponding devices described with reference to FIGS. 1-2. The network may configure groups of cells for a UE. In some examples, a cell set 305 may include one or more cell groups (e.g., cell group 310 and cell group 315). Each cell group may include multiple TRPs and may support multiple CCs. For example, cell group 310 may include a first TRP (e.g., cell 320-a supporting a first carrier and cell 320-b supporting a second carrier, etc.), and a second TRP (e.g., cell 325-a supporting a first carrier and cell 325-b supporting a second carrier, etc.). The cell group 315 may include a first TRP (e.g., cell 330-a supporting a first carrier and cell 330-b supporting a second carrier, etc.), and a second TRP (e.g., cell 335-a supporting a first carrier and cell 335-b supporting a second carrier, etc.).

In some examples, activation or deactivation may be done at a cell group level. For instance, the network may configure the first cell group. For example, the network may configure one or more cell groups to be eligible for activation by L1 or L2 signaling (e.g., via a higher layer parameter such as L1L2MobilityCellGroupConfigList). The configured cell set may include multiple cells or multiple cell groups (e.g., a cell set 305 including the cell group 310 and the cell group 315). The network may provide, to each served UE, configuration information for each cell in the cell set 305 (e.g., cell 320, cell 325, cell 330, and cell 335). The configuration information for each cell may include configuration information for each candidate role of a set of candidate roles (e.g., pTRP, aTRP, etc.), for various carriers (e.g., PCell, SCell, PSCell, etc.), among other examples. For example, the network may configure each of cell 320, cell 325, cell 330, and 335, with parameters for acting as a pTRP or an aTRP, or for communicating using PCells, SCells, and PSCells.

In some examples, a UE may support one active cell group at a time. In such examples, having configured the UE with multiple cell groups, the network may dynamically switch the UE from one cell group to another cell group (e.g., which may be referred to as a cell group switch). In such examples, the UE may communicate with the network via the cell group 310 (e.g., including cell 320 and cell 325 in an mTRP deployment). The network may transmit L1 or L2 signaling (e.g., a MAC-CE or a DCI message) indicating that the UE is to switch from the cell group 310 to the cell group 315. The UE may then perform a cell group switch responsive to the L1 or L2 signaling and may continue communications with the network via the cell group 315 (e.g., via the cell 330 and the cell 335 in an mTRP deployment).

In some examples, the cell group configuration may be provided to the UE as an initial or reference configuration for a first cell or cell group, and a delta configuration with respect to the reference cell or cell group. For example, the network may provide configuration information for the cell 320 (e.g., including carrier information or cell 320-a and cell 320-b, operative role configurations for the TRP associated with cell 320, etc.), and may provide configuration information for the cell 325 in the form of deltas from the configuration information for the cell 320 (e.g., differences in parameter values from the reference parameter values of the cell 320 for carrier information, role information, or the like).

The configuration information may support cell or role switching via L1 or L2 signaling. For example, the configuration information for each cell group may include configuration information of a PCell, a pTRP, or both. For example, the configuration information may configure the TRP associated with cell 320 as a pTRP, may configure the cell 320-a as the PCell, or both. One or more cells (e.g., SCells or other TRPs) in a cell group may be configured with PCell and pTRP configuration information. For instance, the TRP associated with the cell 325 may be configured to perform the operative role of an aTRP using resources of an SCell but may also be configured with a candidate role of pTRP, and with configuration information to operate according to a PCell. Such configuration information may support PCell changes, or TRP role changes within the cell group. Changes to operative roles and cell use may be performed by the UE as triggered by the network after cell group activation, or at the time of activation (e.g., including an update to a default cell group configuration). For instance, the default configuration for the cell group 310 may include the TRP associated with the cell 320 operating as a pTRP (e.g., while also configured with parameters to operate as an aTRP), while the TRP associated with the cell 325 may be configured to operate as an aTRP (e.g., while also configured with parameters to operate as a pTRP). In such examples, L1 or L2 signaling after activation of the cell group 310 may indicate that the TRP associated with the cell 320 is to assume the operative role of an aTRP and that the TRP associated with the cell 325 is to assume the operative role of a pTRP. Similarly, cell 320 may be instructed via the L1 or L2 signaling to switch from a PCell to an SCell, while the cell 325 may be instructed to switch from an SCell to a PCell. Such changes may also be triggered at the time of activation (e.g., in the same L1 or L2 signaling that activates the cell group 310 from an inactive state to an active state).

Figure 4:
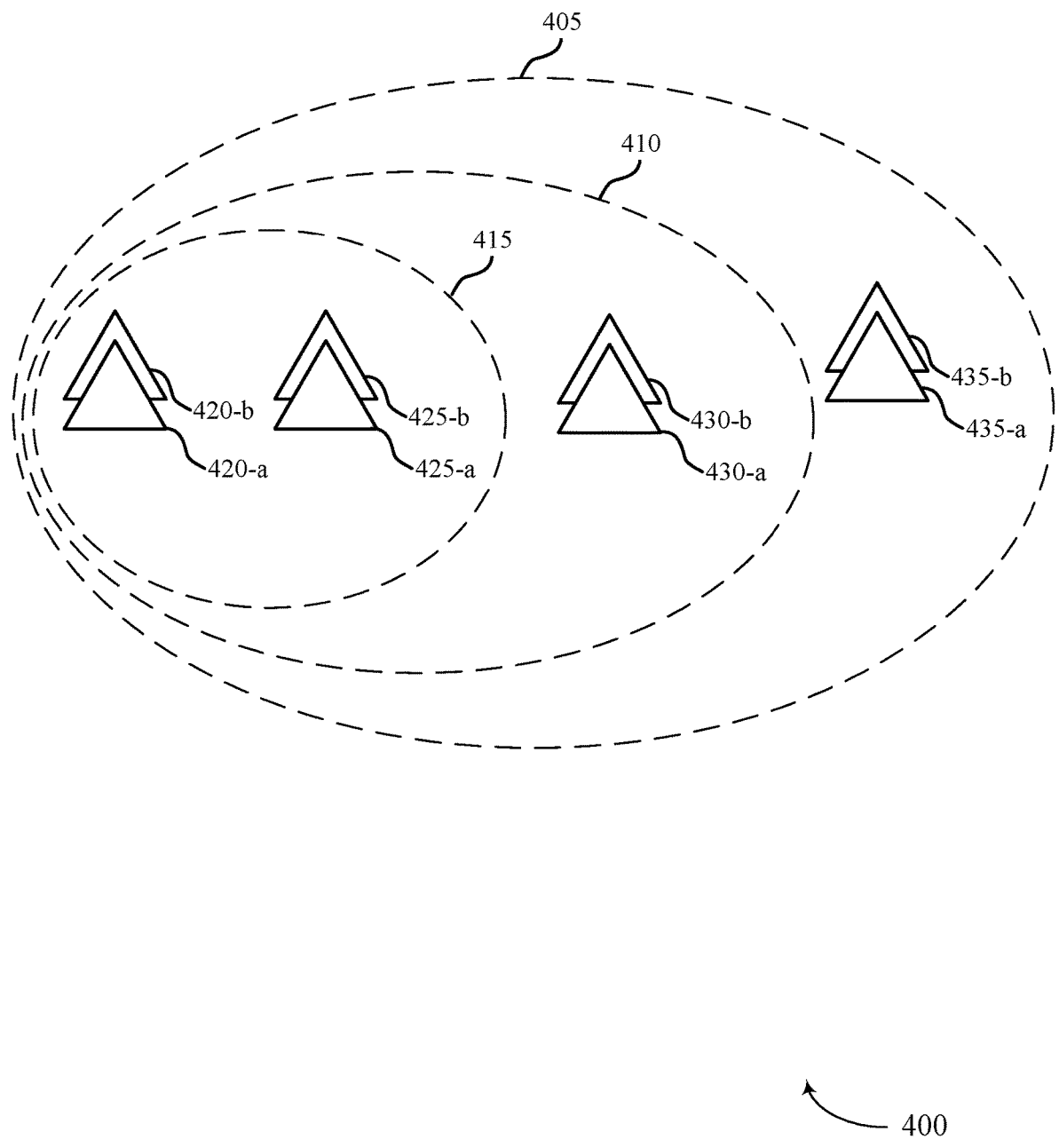
FIG. 4 illustrates an example of a wireless communications system that supports group configuration for inter-cell mobility in mTRP deployments in accordance with one or more aspects of the present disclosure.

FIG. 4 illustrates an example of a wireless communications system 400 that supports group configuration for inter-cell mobility in mTRP deployments in accordance with one or more aspects of the present disclosure. Wireless communications system 400 may implement, or be implemented by, aspects of wireless communications system 100, wireless communications system 200, and wireless communications system 300. For example, the wireless communications system 400 may include one or more network entities, one or more UEs, and one or more TRPs (e.g., associated with one or more cells), any of which may be examples of corresponding devices described with reference to FIGS. 1-3. In some examples, a set of mTRP cells 405 may include one or more cells or cell groups (e.g., cell 420, cell 425, cell 430, and cell 435 may all support mTRP deployments and may be configured for mTRP deployments). In some examples each cell may be associated with a TRP. In some examples, each cell may support multiple carriers (e.g., cell 420-a may be associated with a first carrier, and cell 420-b may be associated with a second carrier, cell 425-a may be associated with a first carrier, and cell 425-b may be associated with a second carrier, cell 430-a may be associated with a first carrier, and cell 430-b may be associated with a second carrier, and cell 435-a may be associated with a first carrier, and cell 435-b may be associated with a second carrier). Of the various mTRP configured cells, the network may configure a cell set 410 for L1 or L2 mobility (e.g., the network may configure cell 420, cell 425, and cell 430 with multiple candidate operative roles and various carriers for dynamic switching). The network may activate a cell group 415 from the cell set 410.

As described herein, the network may configure each cell group with configuration information for multiple candidate operative roles and cells. Such configuration information may be referred to as L1/L2 mobility configuration information. The configuration information may be performed on a cell group level. For example, the network may provide, to one or more UEs, higher layer signaling (e.g., RRC signaling) including one or more information elements (IEs). For example, an IE L1L2MobilityCellGroupConfig may include configuration information for each cell group. Each cell group may be identified by an IE, such as L1L2MobilityCellGroupID. Each cell may be associated with a TRP (e.g., a pTRP or an aTRP) within the same serving cell. Each cell group may be configured with an IE for each candidate role (e.g., pTRP and aTRP). For instance, each cell group may be configured with an IE (e.g., an spCellconfig-like IE) for a pTRP, and an IE (e.g., an sCell-Config-like IE) for one or more aTRPs (e.g., cells with additional PCIs different from that of the pTRP). The network may also signal a pTRP assignment using L1 or L2 signaling (e.g., indicating whether a TRP is to assume the operative role of pTRP based on the pTRP IE or an aTRP based on the aTRP IE). The network may select an additional PCIindex associated with an aTRP to apply the configuration specified in the spCellConfig IE for the cell group. An example of RRC configuration information supporting L1 and L2 mobility as described herein, including a higher layer parameter maintain such a cell (e.g., the cell 435) in the cell set 410 may result in unnecessary power expenditures and use of computational resources by the UE. In such examples, it may be beneficial for the UE to refrain from expending such computational resources and power resulting from maintaining the cell 435 in the cell set 410.

In some examples, the network may enable or disable cells I via RRC configuration information. For example, as a UE changes its location, the UE may be farther and farther away from the cell 430. In such examples, the network may disable or release the cell 430 form the cell set 410. In some examples, such information (e.g., releasing the cell 430) may include in the configuration information of an RRC message (e.g., the network may enable or disable L1L2MObiltiyConfig in an L1L2MobiltyCellGroupConfig IE for each cell. If an L1L2MobiltiyRelease IE is enabled for a cell or a cell group, then all other elements in an L1L2MobilityCellGroupConfig may be considered invalid. An example of such an indicator in an IE is as follows:

```
L1L2MobilityCellGroupConfig : :=     SEQUENCE{
    ...
        l1L2MobilityRelease              enable - optional
}
```

```
L1L2MobilityCellGroupConfig, is as follows:
SpCellConfig : : =           SEQUENCE {
    servCellIndex            ServCellIndex              OPTIONAL,     - - Cond SCG
    reconfigurationWithSync  ReconfigurationWithSync    OPTIONAL,     - - Cond
ReconfWithSync
    rlf-TimersAndConstants   SetupRelease {RLF-TimersAndConstants}
                             OPTIONAL, -- Need M
    rlmInSyncOutOfSyncThreshold ENUMERATED {n1}         OPTIONAL,     - - Need S
    spCellConfigDedicated    ServingCellConfig          OPTIONAL,     - - Need M
    ...
}
ServingCellConfig   : : =                 SEQUENCE {
    ...
[ [
    l1l2MobilityConfig       L1L2MobilityConfig         OPTIONAL, -- Cond
SCellAddMod
    additionalPCIList-r17 : :=      SEQUENCE (SIZE (1. . maxNrofAddionalPCI) )
OF SSB-MTC-AddionalPCI-r17    OPTIONAL,     - - Need R
    ...
] ]
    L1L2MobilityCellGroupConfig : := SEQUENCE {
        l1L2MobilityCellGroupId      L1L2MobilityCellGroupId,
        spCellConfig                 spCell-like Config,
        sCellToAddModList            SEQUENCE (SIZE (1. . maxNrofadditionalPCIs) )
                                     of SCellConfig
        sCelltoReleaseList           SEQUENCE (SIZE (1. . maxNrofadditionalPCIs) )
                                     of AdditionalPCIIndex-r17
```

In some examples, based on the configuration information, the network may remove or release cell groups from the cell set 410 (e.g., from the set of cell groups configured for L1 or L2 mobility signaling. For example, as a UE moves, some cells may no longer be suitable for L1 or L2 signaling-based mobility (e.g., the UE may be too far away from these cells). The UE may store such cells in a deactivated cell set in the cell set 410 (e.g., in a configured L1/L2 mobility set). However, the UE may still perform measurements on the deactivated cell set, resulting in unnecessary power consumption and uplink reporting overhead. Continuing to In some examples, the network may add or remove cells or cell groups from the cell set 410 (e.g., may enable or disable L1L2MobiltiyConfig for one or more cells) via a release list (e.g., a release list in an IE such as servingCellConfig). Such enabling or disabling may be motivated by a configuration information IE such as sCellTToReleaseList in an IE such as CellGroupConfig for CA. The enabling or disabling signaling for a cell group or cell may utilize an IE indicating an identifier for each cell group or cell (e.g., the IE L1L2MobilityCellGroupId). An example of such signaling is as follows:

```
CellGroupConfig : : =                    SEQUENCE {
...
    ServingCellConfig   : : =            SEQUENCE {
    ...
        l1L2MobilitycellGroupToReleaseList              SEQUENCE  (SIZE
1 . . maxNrofL1L2MobilityCellGroups) ) OF l1L2MobilityCellGroupId
OPTIONAL
``` where the maxNrofL1L2MobiltiyCelGroups is defined by a threshold (e.g., maximum) number of cell groups that are configured with L1L2MObilityConfig. The IE L1L2MobilnycellGruopToReleaseList may include a list of cell groups that are configured with L1L2MobilityConfig to be removed from the cell set 410.

In some examples, the network may configure the cells or cell groups via the configuration information, and may subsequently add or remove (e.g., release) a cell or cell group by enabling or disabling the mobility of the cell or cell group (e.g., via an indicator in a MAC-CE or DCI with reference to the RRC configuration information).

Figure 5:
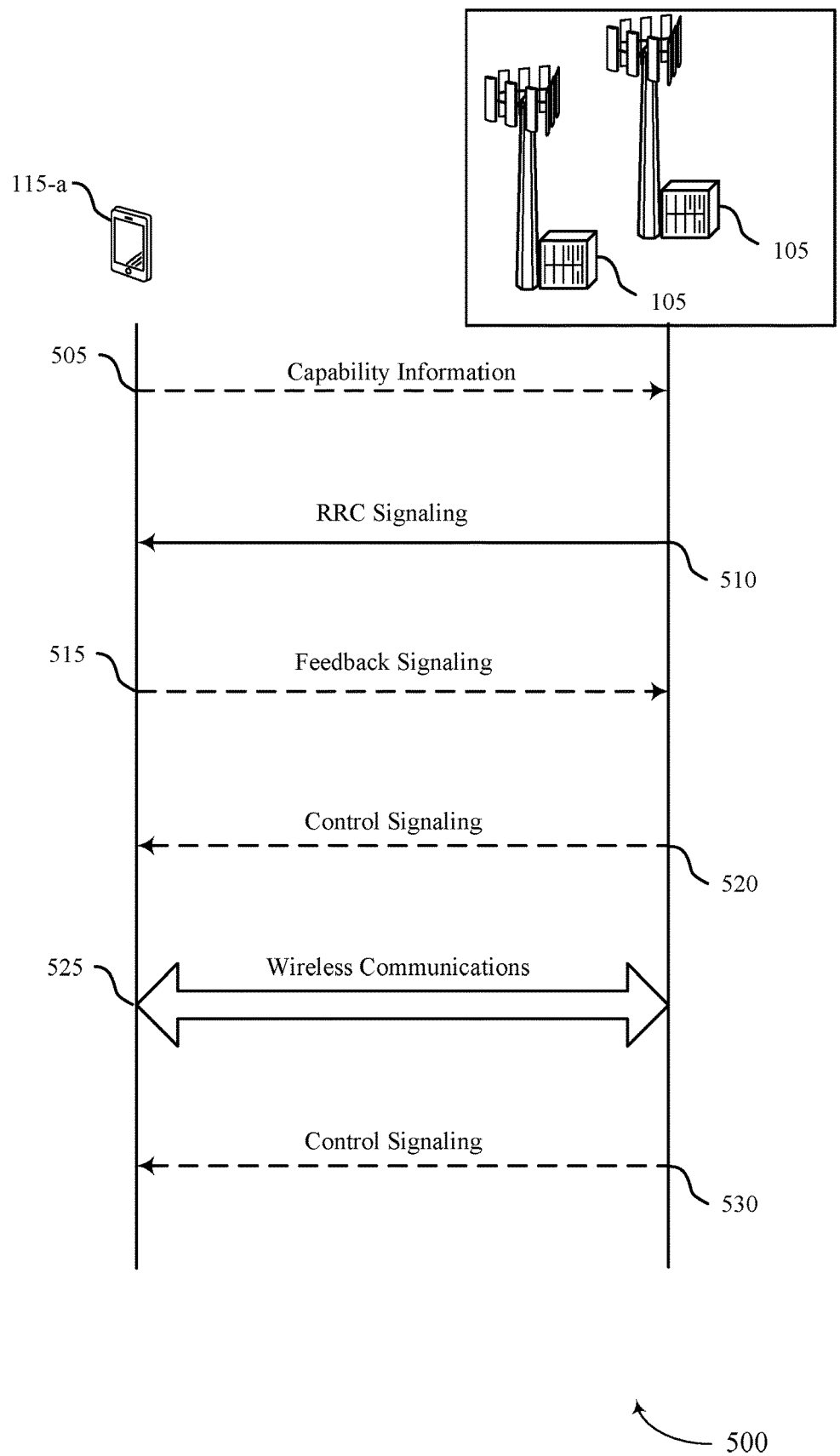
FIG. 5 illustrates an example of a process flow that supports group configuration for inter-cell mobility in mTRP deployments in accordance with one or more aspects of the present disclosure.

FIG. 5 illustrates an example of a process flow 500 that supports group configuration for inter-cell mobility in mTRP deployments in accordance with one or more aspects of the present disclosure. The process flow 500 may implement, or be implemented by, aspects of wireless communications system 100, wireless communications system 200, wireless communications system 300, and wireless communications system 400. For example, the process flow 500 may include one or more network entities 105 (e.g., which may represent one or more TRPs of one or more cells), and one or more UEs (e.g., the UE 115-*a*), any of which may be examples of corresponding devices described with reference to FIGS. 1-4.

At 510, the UE 115-*a* may receive RRC signaling (e.g., from the one or more network entities, which may be one or more TRPs in an mTRP deployment associated with a first cell group). The RRC signaling may indicate cell group configuration information for multiple cell groups (e.g., including the cell group to which the network entities 105 are associated). The cell group configuration information (e.g., as indicated by one or more IEs such as L1L2MobilityCellGroupConfig) may include multiple corresponding sets of parameters for each cell in the cell group. The multiple respective sets of parameters for each cell in the cell group may include a respective set of parameters for each candidate role of a set of candidate roles (e.g., pTRP and aTRP, PCell, SCell, SpCell, etc.) associated with mTRP deployments.

In some examples, the RRC signaling may be for multiple cell groups. For example, the RRC signaling may include second cell group configuration information for at least a second set of multiple cells in a second cell group associated with a second serving cell. The second cell group configuration information may include, for each cell in the second cell group, multiple corresponding sets of parameters including a respective set of parameters for each candidate role of the set of candidate roles associated with the mTRP deployment.

In some examples, the UE 115-*a* may report its capability to support multiple cell groups. For example, at 505, the UE 115-*a* may transmit capability information indicating that the UE 115-*a* is capable of supporting multiple cell groups. In such examples, receiving the cell group configuration information for the second set of cells in the second cell group is based at least in part on transmitting the capability information.

In some examples, the RRC configuration information may include, for each cell in a cell group, multiple corresponding sets of parameters including the multiple sets of parameters for a first cell of the group of cells, and a set of offsets associated with the first multiple sets of parameters for each other cell in the cell group. In such examples, the parameters for each cell in the cell group may be determined by the UE 115-*a* by applying the offsets to the reference or default cell of the group of cells (e.g., each set of parameters for each other cell in the group of cells is defined in terms of deltas or offsets from the sets of parameters for a reference cell in the group of cells).

In some examples, at 515, the UE 115-*a* may transmit feedback signaling. For example, upon receiving the RRC signaling at 510, the UE 115-*a* may acknowledge the reception by transmitting an acknowledgement (ACK) message. The feedback signaling may include RRC reconfiguration complete signaling.

At 520, the UE 115-*a* may receive control signaling (e.g., L1 or L2 signaling, such as MAC-CE or DCI signaling) that indicates an activation status for one or more of the cells in the cell group, or one or more cell groups of the multiple cell groups. The control signaling may include an indication of an operative role for each of the cells in cell group from among the candidate roles (e.g., may indicate that a TRP is to assume the operative role of pTRP or aTRP). In some examples, the control signaling may indicate a default operative role, or may indicate a switch from a default operative role to a new operative role. The UE 115-*a* may receive the control signaling from the same TRPs (e.g., the same cell or cell group) from which the UE 115-*a* received the RRC signaling at 510, or from a different TRP or group of TRPs (e.g., depending on an active state of the cell, mobility of the UE, etc.).

At 525, the UE 115-*a* may perform wireless communications with one or more TRPs (e.g., the network entities 105 of a same cell or cell group, or a different cell or cell group, based on the control signaling received at 520). The UE 115-*a* may perform the wireless communications with one or more cells or cell groups of the multiple cell groups according to the operative roles for the multiple cells in the cell group in the mTRP deployment. For example, the UE 115-*a* may switch from the first cell group to the second cell group, or the UE 115-*a* may switch individual roles of cells within one or more c ell groups, based on the control signaling at 520.

Figure 6:
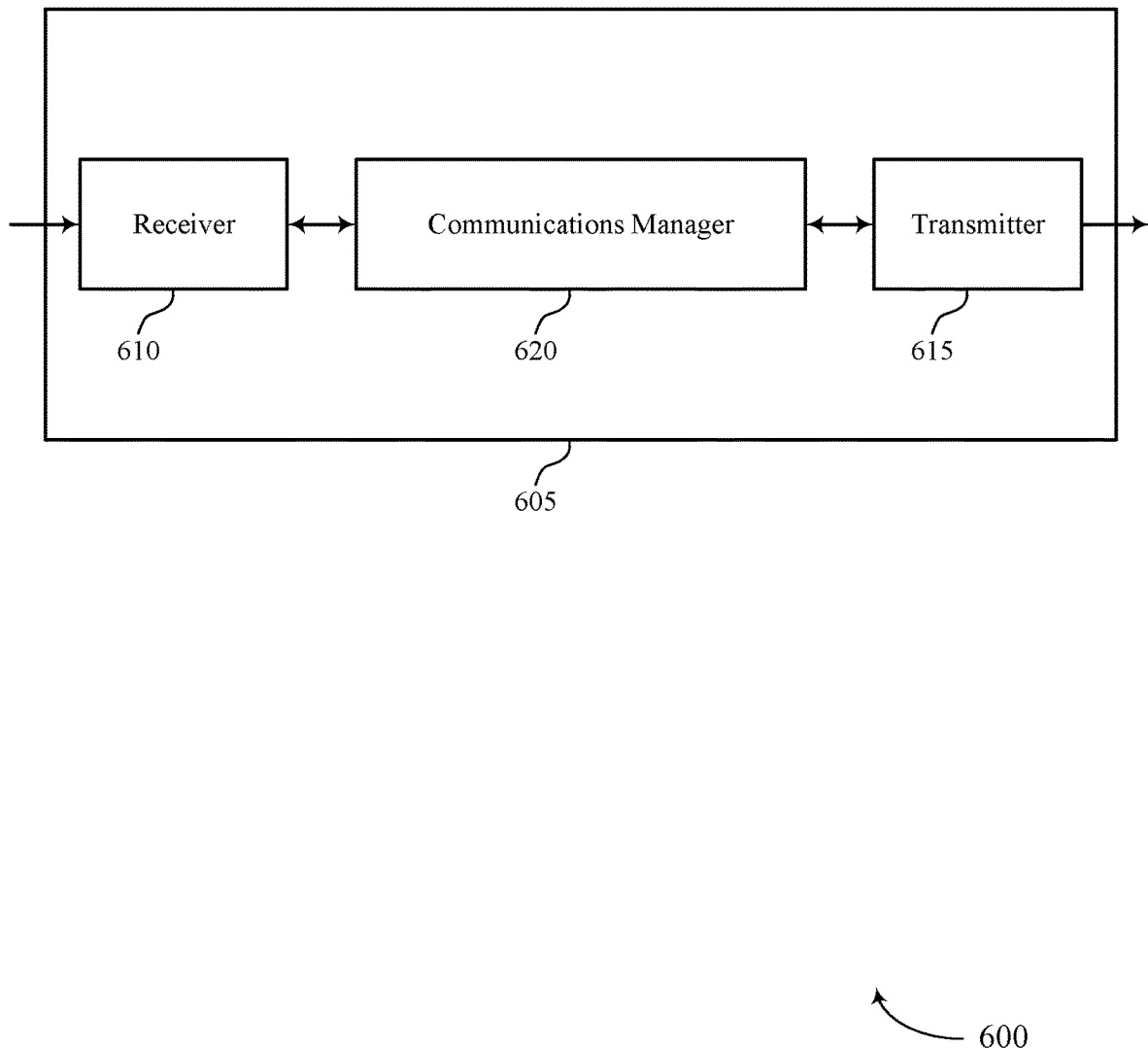
FIGS. 6 and 7 show block diagrams of devices that support group configuration for inter-cell mobility in mTRP deployments in accordance with one or more aspects of the present disclosure.

In some examples, at 530, the UE 115-*a* may receive (e.g., from the same cell or a different cell based on the configured groups of cells and the control signaling) RRC signaling removing a cell or a cell group from the set of cells or cell groups configured at 510 (e.g., from the multiple cell groups including at least one active cell group and at least one inactive cell group. In some examples, the RRC signaling may include FIG. 6 shows a block diagram 600 of a device 605 that supports group configuration for inter-cell mobility in mTRP deployments in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to group configuration for inter-cell mobility in mTRP deployments). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to group configuration for inter-cell mobility in mTRP deployments). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of group configuration for inter-cell mobility in mTRP deployments as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a mTRP deployment. The communications manager 620 may be configured as or otherwise support a means for receiving control signaling that indicates an activation status for one or more of the set of multiple cells in the cell group, an indication of an operative role for each of the set of multiple cells in the cell group from among the set of candidate roles, or a combination thereof. The communications manager 620 may be configured as or otherwise support a means for performing wireless communications with the set of multiple cells in the cell group according to the operative roles for the set of multiple cells in the cell group in the mTRP deployment.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for cell group configuration and L1 or L2 mobility management resulting in improved communication reliability, reduced latency, more efficient use of system resources, and improved user experience.

Figure 7:
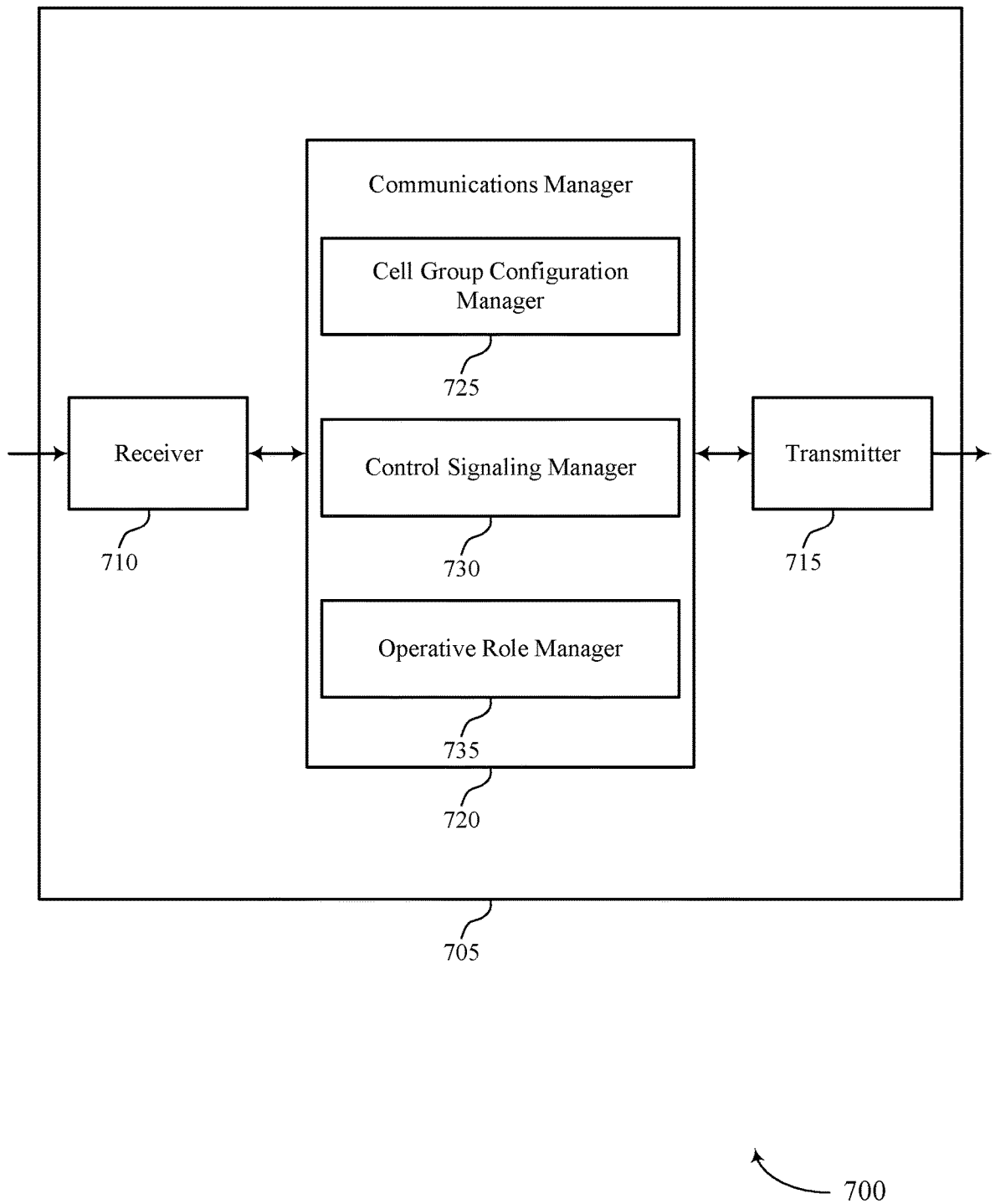

FIG. 7 shows a block diagram 700 of a device 705 that supports group configuration for inter-cell mobility in mTRP deployments in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to group configuration for inter-cell mobility in mTRP deployments). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to group configuration for inter-cell mobility in mTRP deployments). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of group configuration for inter-cell mobility in mTRP deployments as described herein. For example, the communications manager 720 may include a cell group configuration manager 725, a control signaling manager 730, an operative role manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The cell group configuration manager 725 may be configured as or otherwise support a means for receiving RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a mTRP deployment. The control signaling manager 730 may be configured as or otherwise support a means for receiving control signaling that indicates an activation status for one or more of the set of multiple cells in the cell group, an indication of an operative role for each of the set of multiple cells in the cell group from among the set of candidate roles, or a combination thereof. The operative role manager 735 may be configured as or otherwise support a means for performing wireless communications with the set of multiple cells in the cell group according to the operative roles for the set of multiple cells in the cell group in the mTRP deployment.

Figure 8:
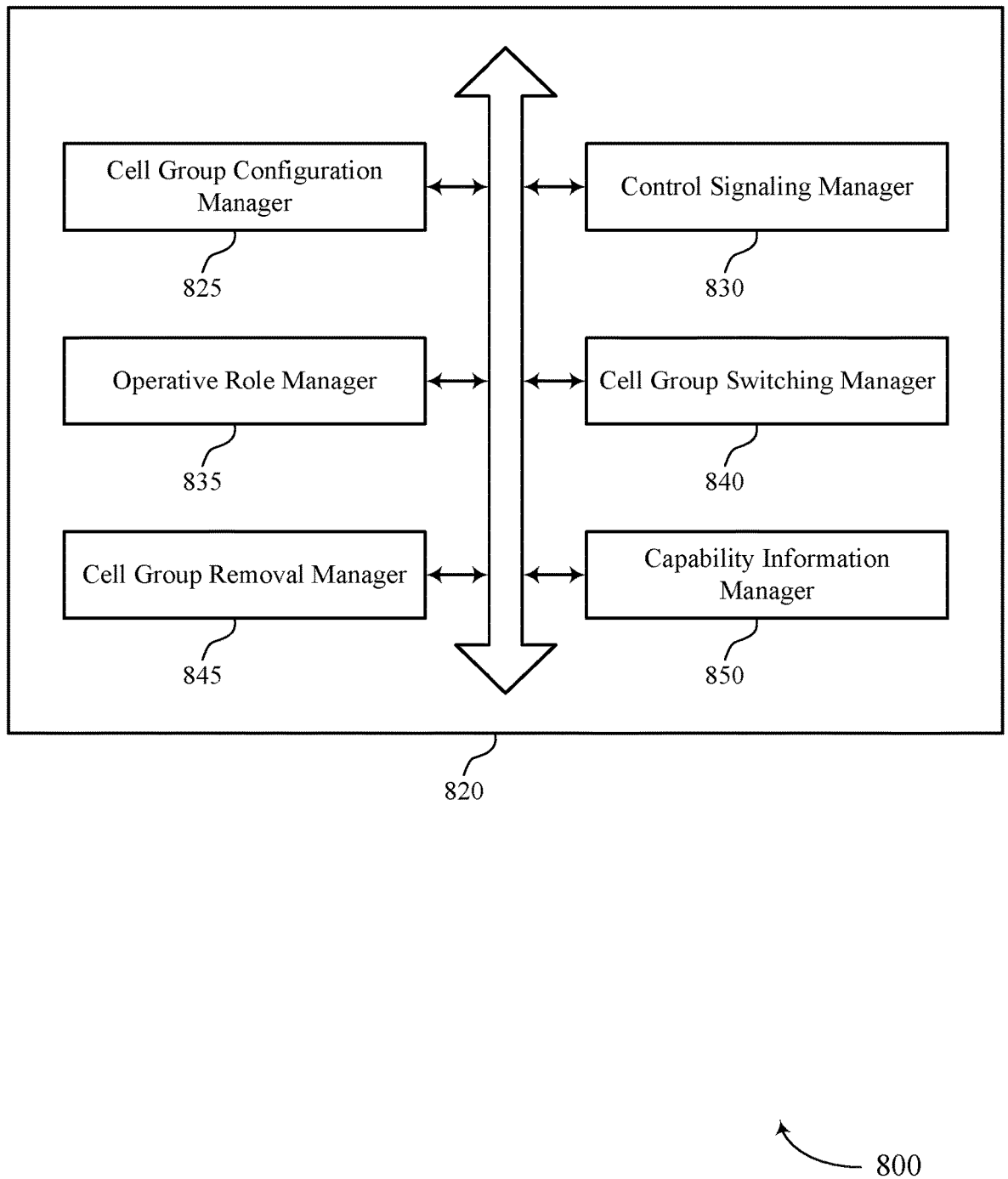
FIG. 8 shows a block diagram of a communications manager that supports group configuration for inter-cell mobility in mTRP deployments in accordance with one or more aspects of the present disclosure.

FIG. 8 shows a block diagram 800 of a communications manager 820 that supports group configuration for inter-cell mobility in mTRP deployments in accordance with one or more aspects of the present disclosure. The communications manager 820 may be an example of aspects of a communications manager 620, a communications manager 720, or both, as described herein. The communications manager 820, or various components thereof, may be an example of means for performing various aspects of group configuration for inter-cell mobility in mTRP deployments as described herein. For example, the communications manager 820 may include a cell group configuration manager 825, a control signaling manager 830, an operative role manager 835, a cell group switching manager 840, a cell group removal manager 845, a capability information manager 850, or any combination thereof. Each of these components may communicate, directly or indirectly, with one another (e.g., via one or more buses).

The communications manager 820 may support wireless communications at a UE in accordance with examples as disclosed herein. The cell group configuration manager 825 may be configured as or otherwise support a means for receiving RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a mTRP deployment. The control signaling manager 830 may be configured as or otherwise support a means for receiving control signaling that indicates an activation status for one or more of the set of multiple cells in the cell group, an indication of an operative role for each of the set of multiple cells in the cell group from among the set of candidate roles, or a combination thereof. The operative role manager 835 may be configured as or otherwise support a means for performing wireless communications with the set of multiple cells in the cell group according to the operative roles for the set of multiple cells in the cell group in the mTRP deployment.

In some examples, the cell group configuration manager 825 may be configured as or otherwise support a means for receiving, in the RRC signaling, second cell group configuration information for a second set of multiple cells in a second cell group associated with a second serving cell, the second cell group configuration information including, for each cell in the second cell group, multiple corresponding sets of parameters including a respective set of parameters for each candidate role of the set of candidate roles associated with the mTRP deployment.

In some examples, the capability information manager 850 may be configured as or otherwise support a means for transmitting capability information indicating that the UE is capable of supporting a set of multiple cell groups, where receiving the cell group configuration information for the set of multiple cells in the cell group and receiving the cell group configuration information for the second set of multiple cells in the second cell group is based on transmitting the capability information.

In some examples, the cell group switching manager 840 may be configured as or otherwise support a means for receiving, in the control signaling, an instruction to switch from communicating with a second cell group including a second set of multiple cells to communicating with the set of multiple cells in the cell group, where performing wireless communications with the set of multiple cells in the cell group is based on receiving the instruction to switch.

In some examples, to support cell group configuration information including, for each cell in the cell group, multiple corresponding sets of parameters, the cell group configuration manager 825 may be configured as or otherwise support a means for a first set of multiple sets of parameters for a first cell of the set of multiple cells. In some examples, to support cell group configuration information including, for each cell in the cell group, multiple corresponding sets of parameters, the cell group configuration manager 825 may be configured as or otherwise support a means for a set of offsets associated with the first set of multiple sets of parameters, where a second set of multiple sets of parameters for a second cell of the set of multiple cells is based on application of the set of offsets to the first set of multiple sets of parameters.

In some examples, the cell group removal manager 845 may be configured as or otherwise support a means for receiving RRC signaling that removes the cell group from a set of multiple cell groups including at least one active cell group and at least one inactive cell group.

In some examples, to support, for each cell in the cell group, the respective set of parameters for each candidate role of the set of candidate roles, the operative role manager 835 may be configured as or otherwise support a means for a first set of parameters for a first candidate role including a primary TRP role. In some examples, to support, for each cell in the cell group, the respective set of parameters for each candidate role of the set of candidate roles, the operative role manager 835 may be configured as or otherwise support a means for a second set of parameters for a second candidate role including a secondary TRP role.

In some examples, each cell of the set of multiple cells is associated with a TRP of a set of multiple TRPs.

In some examples, to support receiving the control signaling, the control signaling manager 830 may be configured as or otherwise support a means for receiving a DCI message or a MAC-CE that indicates an activation status for one or more of the set of multiple cells in the cell group, an indication of an operative role for each of the set of multiple cells in the cell group from among the set of candidate roles, or a combination thereof.

Figure 9:
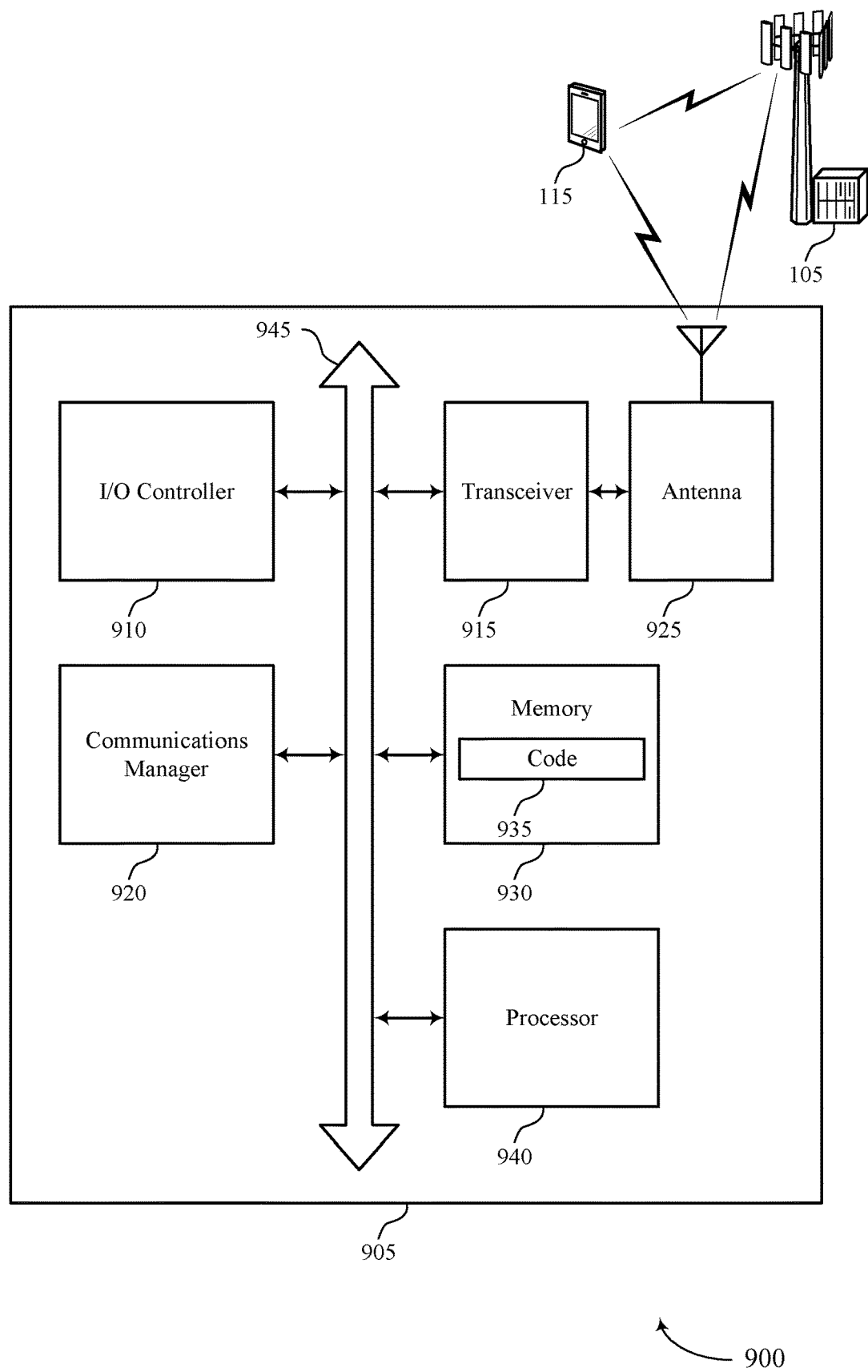
FIG. 9 shows a diagram of a system including a device that supports group configuration for inter-cell mobility in mTRP deployments in accordance with one or more aspects of the present disclosure.

FIG. 9 shows a diagram of a system 900 including a device 905 that supports group configuration for inter-cell mobility in mTRP deployments in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting group configuration for inter-cell mobility in mTRP deployments). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a mTRP deployment. The communications manager 920 may be configured as or otherwise support a means for receiving control signaling that indicates an activation status for one or more of the set of multiple cells in the cell group, an indication of an operative role for each of the set of multiple cells in the cell group from among the set of candidate roles, or a combination thereof. The communications manager 920 may be configured as or otherwise support a means for performing wireless communications with the set of multiple cells in the cell group according to the operative roles for the set of multiple cells in the cell group in the mTRP deployment.

By including or configuring the communications manager 920 in accordance with examples as described herein, the device 905 may support techniques for cell group configuration and L1 or L2 mobility management resulting in improved communication reliability, reduced latency, more efficient use of system resources, and improved user experience.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of group configuration for inter-cell mobility in mTRP deployments as described herein, or the processor 940 and the memory 930 may be otherwise configured to perform or support such operations.

Figure 10:
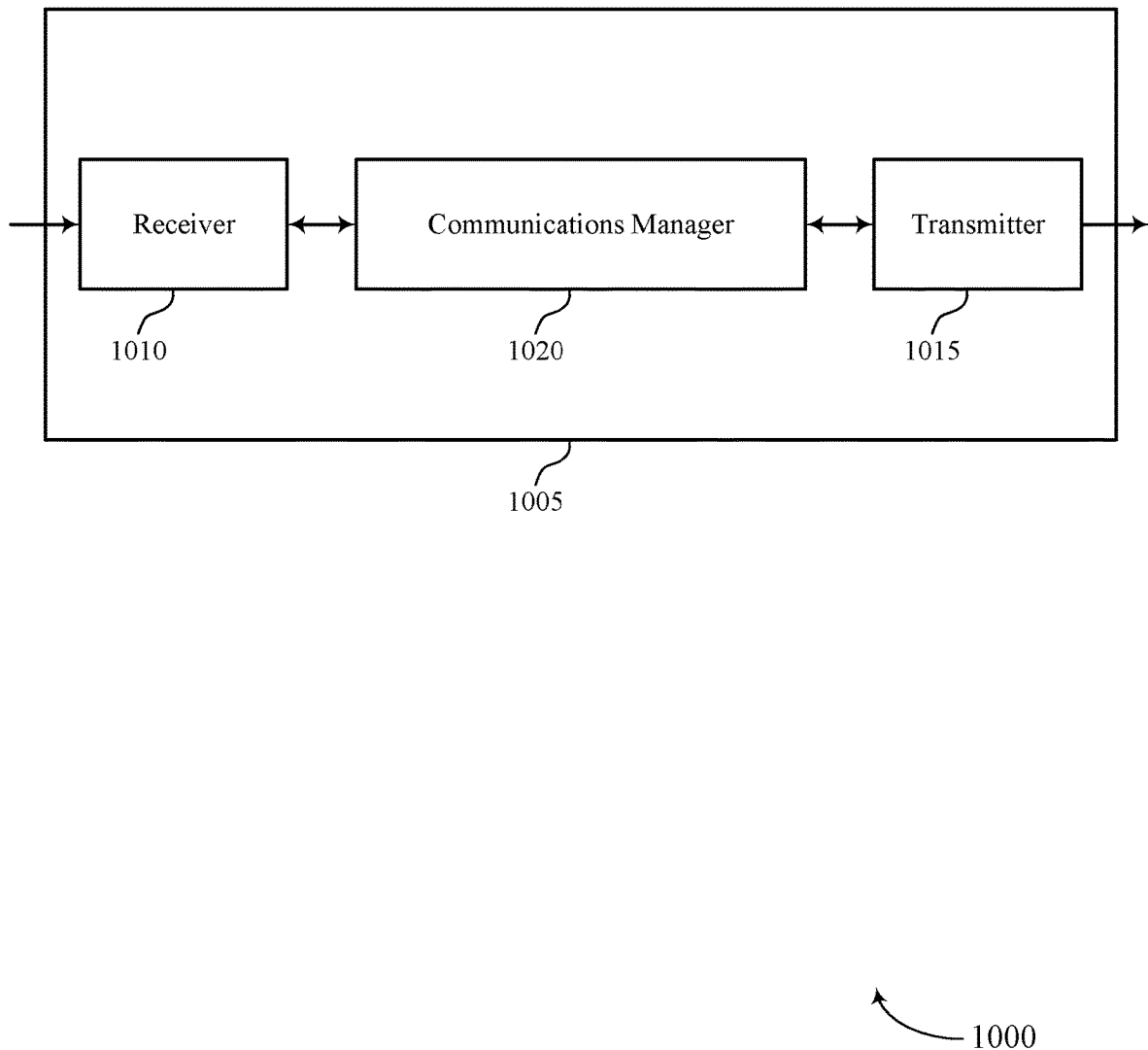
FIGS. 10 and 11 show block diagrams of devices that support group configuration for inter-cell mobility in mTRP deployments in accordance with one or more aspects of the present disclosure.

FIG. 10 shows a block diagram 1000 of a device 1005 that supports group configuration for inter-cell mobility in mTRP deployments in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of group configuration for inter-cell mobility in mTRP deployments as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at one or more network entities in accordance with examples as disclosed herein. For example, the communications manager 1020 may be configured as or otherwise support a means for outputting RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a mTRP deployment. The communications manager 1020 may be configured as or otherwise support a means for outputting control signaling that indicates an activation status for one or more of the set of multiple cells in the cell group, an indication of an operative role for each of the set of multiple cells in the cell group from among the set of candidate roles, or a combination thereof. The communications manager 1020 may be configured as or otherwise support a means for performing wireless communications with one or more UEs according to the operative roles for the set of multiple cells in the cell group in the mTRP deployment.

By including or configuring the communications manager 1020 in accordance with examples as described herein, the device 1005 (e.g., a processor controlling or otherwise coupled with the receiver 1010, the transmitter 1015, the communications manager 1020, or a combination thereof)

may support techniques for cell group configuration and L1 or L2 mobility management resulting in improved communication reliability, reduced latency, more efficient use of system resources, and improved user experience.

Figure 11:
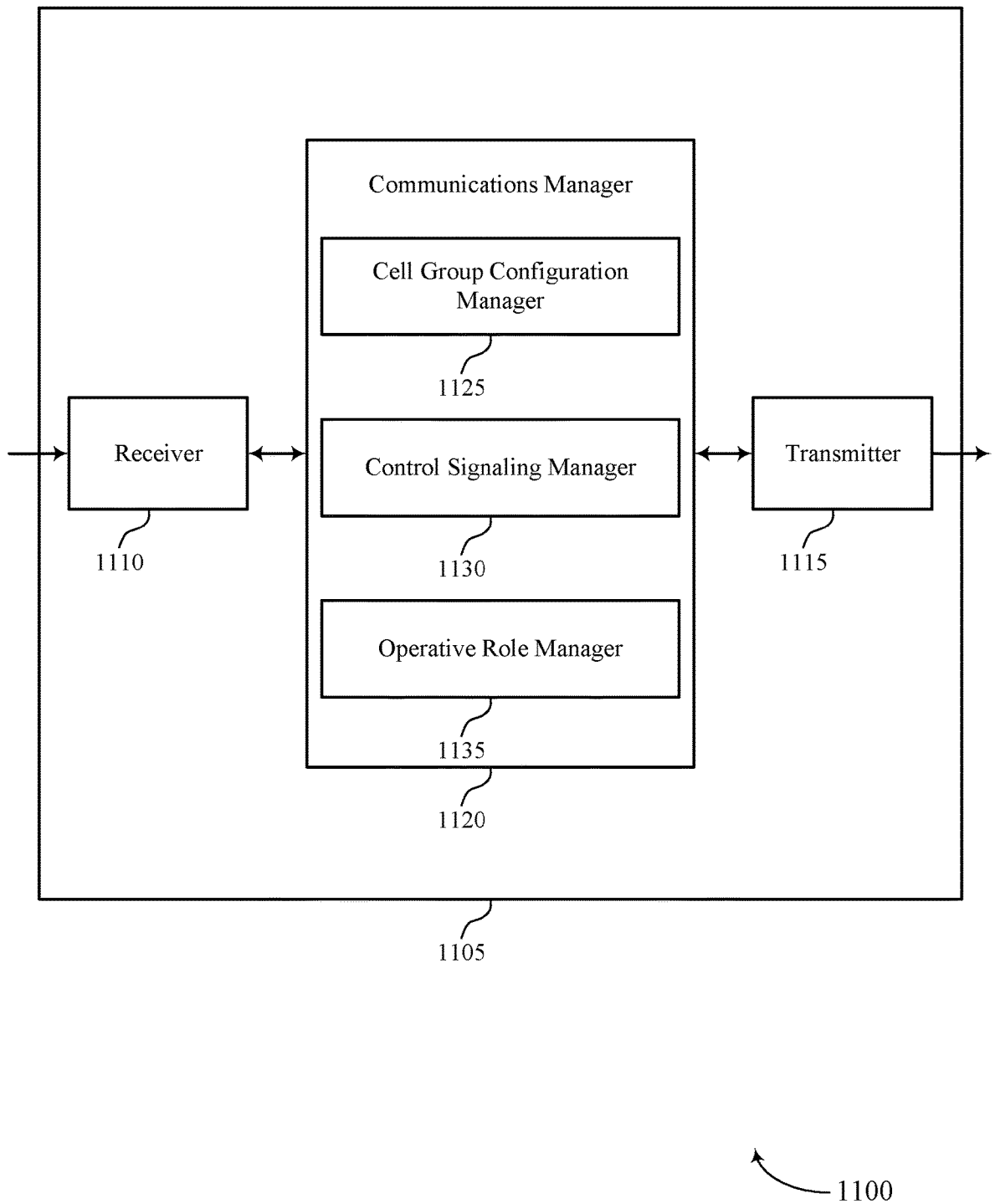

FIG. 11 shows a block diagram 1100 of a device 1105 that supports group configuration for inter-cell mobility in mTRP deployments in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of group configuration for inter-cell mobility in mTRP deployments as described herein. For example, the communications manager 1120 may include a cell group configuration manager 1125, a control signaling manager 1130, an operative role manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at one or more network entities in accordance with examples as disclosed herein. The cell group configuration manager 1125 may be configured as or otherwise support a means for outputting RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a mTRP deployment. The control signaling manager 1130 may be configured as or otherwise support a means for outputting control signaling that indicates an activation status for one or more of the set of multiple cells in the cell group, an indication of an operative role for each of the set of multiple cells in the cell group from among the set of candidate roles, or a combination thereof. The operative role manager 1135 may be configured as or otherwise support a means for performing wireless communications with one or more UEs according to the operative roles for the set of multiple cells in the cell group in the mTRP deployment.

Figure 12:
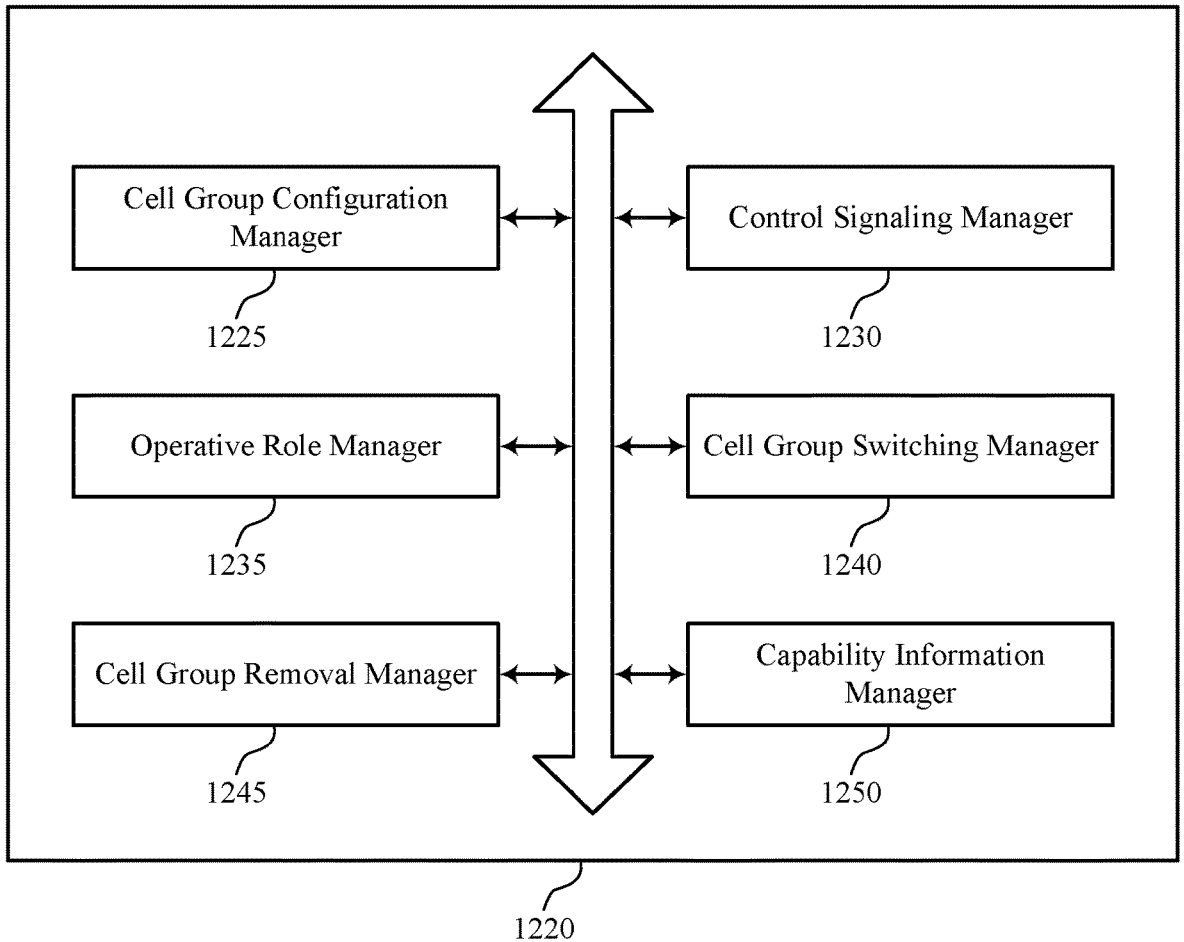
FIG. 12 shows a block diagram of a communications manager that supports group configuration for inter-cell mobility in mTRP deployments in accordance with one or more aspects of the present disclosure.

FIG. 12 shows a block diagram 1200 of a communications manager 1220 that supports group configuration for inter-cell mobility in mTRP deployments in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of group configuration for inter-cell mobility in mTRP deployments as described herein. For example, the communications manager 1220 may include a cell group configuration manager 1225, a control signaling manager 1230, an operative role manager 1235, a cell group switching manager 1240, a cell group removal manager 1245, a capability information manager 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at one or more network entities in accordance with examples as disclosed herein. The cell group configuration manager 1225 may be configured as or otherwise support a means for outputting RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a mTRP deployment. The control signaling manager 1230 may be configured as or otherwise support a means for outputting control signaling that indicates an activation status for one or more of the set of multiple cells in the cell group, an indication of an operative role for each of the set of multiple cells in the cell group from among the set of candidate roles, or a combination thereof. The operative role manager 1235 may be configured as or otherwise support a means for performing wireless communications with one or more UEs according to the operative roles for the set of multiple cells in the cell group in the mTRP deployment.

In some examples, the cell group configuration manager 1225 may be configured as or otherwise support a means for outputting, in the RRC signaling, second cell group configuration information for a second set of multiple cells in a second cell group associated with a second serving cell, the second cell group configuration information including, for each cell in the second cell group, multiple corresponding sets of parameters including a respective set of parameters for each candidate role of the set of candidate roles associated with the mTRP deployment.

In some examples, the capability information manager 1250 may be configured as or otherwise support a means for obtaining capability information indicating that a UE of the one or more UEs is capable of supporting a set of multiple cell groups, where outputting the cell group configuration information for the set of multiple cells in the cell group and outputting the cell group configuration information for the second set of multiple cells in the second cell group is based on transmitting the capability information.

In some examples, the cell group switching manager 1240 may be configured as or otherwise support a means for outputting, in the control signaling, an instruction to switch from communicating with a second cell group including a second set of multiple cells to communicating with the set of multiple cells in the cell group, where performing wireless communications with the one or more UEs is based on receiving the instruction to switch.

In some examples, to support cell group configuration information including, for each cell in the cell group, multiple corresponding sets of parameters, the cell group configuration manager 1225 may be configured as or otherwise support a means for a first set of multiple sets of parameters for a first cell of the set of multiple cells. In some examples, to support cell group configuration information including, for each cell in the cell group, multiple corresponding sets of parameters, the cell group configuration manager 1225 may be configured as or otherwise support a means for a set of offsets associated with the first set of multiple sets of parameters, where a second set of multiple sets of parameters for a second cell of the set of multiple cells is based on application of the set of offsets to the first set of multiple sets of parameters.

In some examples, the cell group removal manager 1245 may be configured as or otherwise support a means for outputting RRC signaling that removes the cell group from a set of multiple cell groups including at least one active cell group and at least one inactive cell group.

In some examples, to support, for each cell in the cell group, the respective set of parameters for each candidate role of the set of candidate roles, the operative role manager 1235 may be configured as or otherwise support a means for a first set of parameters for a first candidate role including a primary TRP role. In some examples, to support, for each cell in the cell group, the respective set of parameters for each candidate role of the set of candidate roles, the operative role manager 1235 may be configured as or otherwise support a means for a second set of parameters for a second candidate role including a secondary TRP.

In some examples, each cell of the set of multiple cells is associated with a TRP of a set of multiple TRPs.

In some examples, to support outputting the control signaling, the control signaling manager 1230 may be configured as or otherwise support a means for outputting a DCI message or a MAC-CE that indicates an activation status for one or more of the set of multiple cells in the cell group, an indication of an operative role for each of the set of multiple cells in the cell group from among the set of candidate roles, or a combination thereof.

Figure 13:
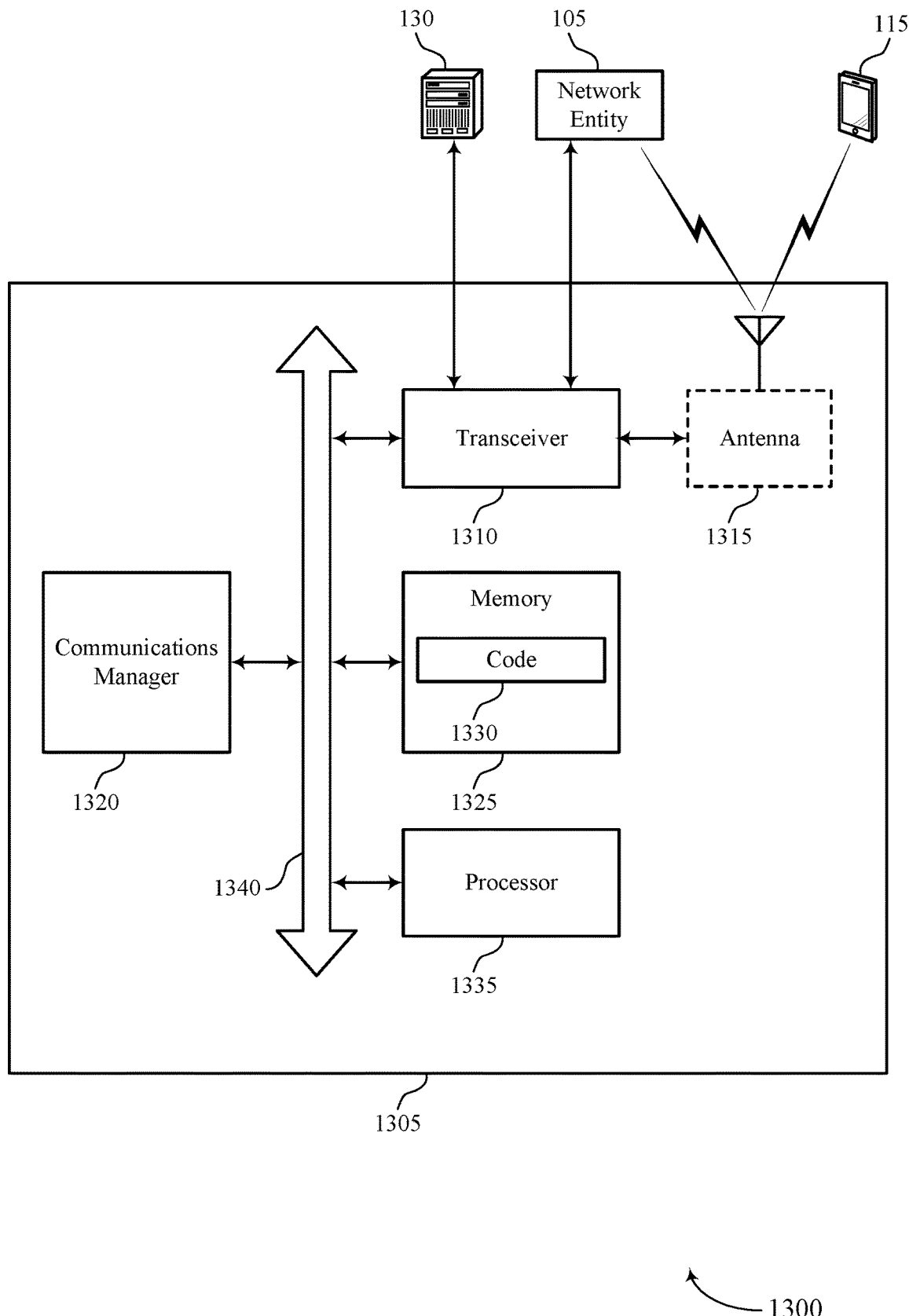
FIG. 13 shows a diagram of a system including a device that supports group configuration for inter-cell mobility in mTRP deployments in accordance with one or more aspects of the present disclosure.

FIG. 13 shows a diagram of a system 1300 including a device 1305 that supports group configuration for inter-cell mobility in mTRP deployments in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting group configuration for inter-cell mobility in mTRP deployments). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305 and may process information received from other components (such as inputs or signals) or output information to other components. For example, a chip or modem of the device 1305 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1305 may transmit information output from the chip or modem. In some implementations, the second interface may refer to an interface between the processing system of the chip or modem and a receiver, such that the device 1305 may obtain information or signal inputs, and the information may be passed to the processing system. A person having ordinary skill in the art will readily recognize that the first interface also may obtain information or signal inputs, and the second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105 and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at one or more network entities in accordance with examples as disclosed herein. For example, the communications manager 1320 may be configured as or otherwise support a means for outputting RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a mTRP deployment. The communications manager 1320 may be configured as or otherwise support a means for outputting control signaling that indicates an activation status for one or more of the set of multiple cells in the cell group, an indication of an operative role for each of the set of multiple cells in the cell group from among the set of candidate roles, or a combination thereof. The communications manager 1320 may be configured as or otherwise support a means for performing wireless communications with one or more UEs according to the operative roles for the set of multiple cells in the cell group in the mTRP deployment.

By including or configuring the communications manager 1320 in accordance with examples as described herein, the device 1305 may support techniques for cell group configuration and L1 or L2 mobility management resulting in improved communication reliability, reduced latency, more efficient use of system resources, and improved user experience.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. For example, the communications manager 1320 may be configured to receive or transmit messages or other signaling as described herein via the transceiver 1310. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of group configuration for inter-cell mobility in mTRP deployments as described herein, or the processor 1335 and the memory 1325 may be otherwise configured to perform or support such operations.

Figure 14:
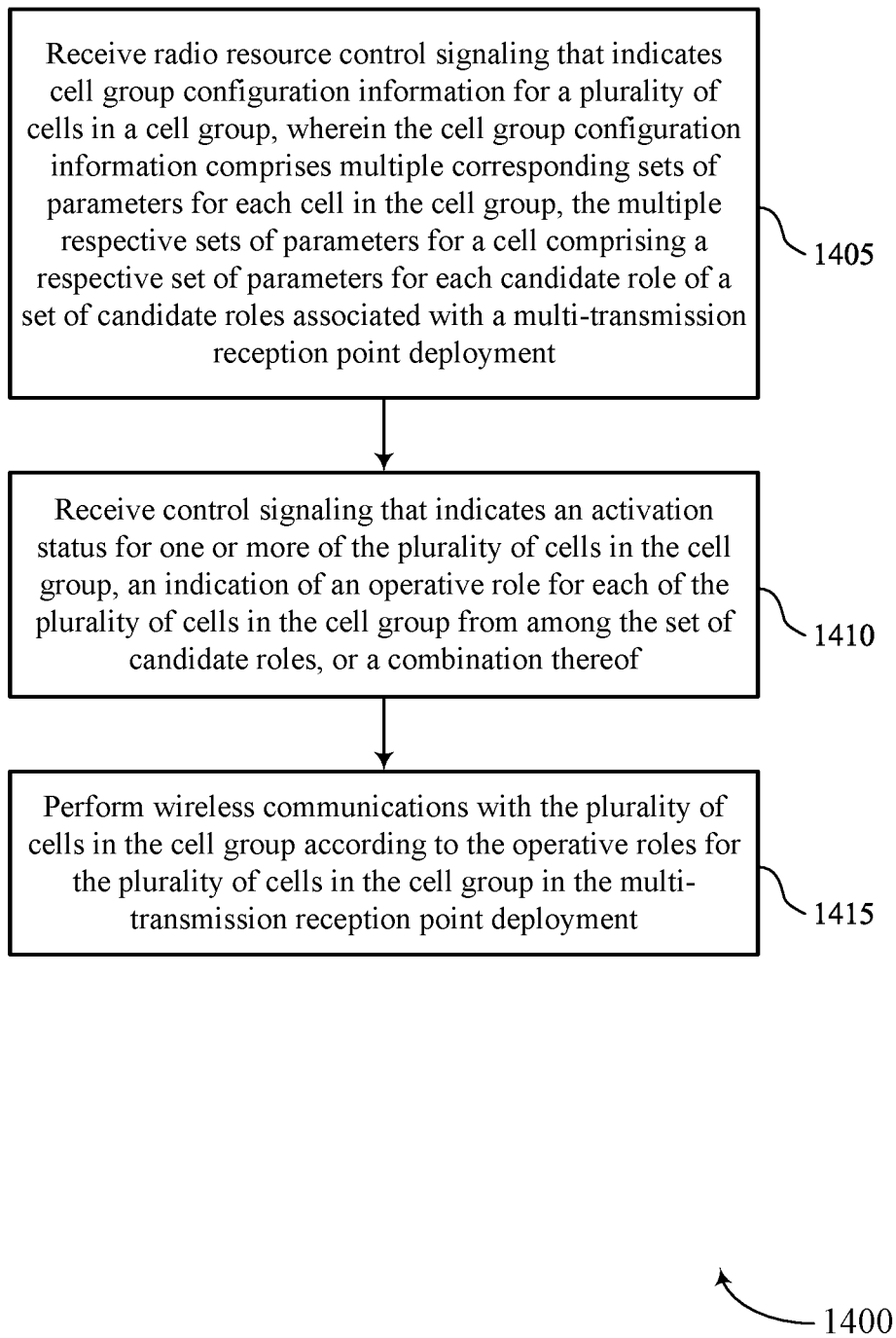
FIGS. 14 and 15 show flowcharts illustrating methods that support group configuration for inter-cell mobility in mTRP deployments in accordance with one or more aspects of the present disclosure.

FIG. 14 shows a flowchart illustrating a method 1400 that supports group configuration for inter-cell mobility in mTRP deployments in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving RRC signaling that indicates cell group configuration information for a set of multiple cells in a cell group, where the cell group configuration information includes multiple corresponding sets of parameters for each cell in the cell group, the multiple respective sets of parameters for a cell including a respective set of parameters for each candidate role of a set of candidate roles associated with a mTRP deployment. The operations of 1405 may be performed in accordance with examples as disclosed herein. In some examples, aspects of the operations of 1405 may be performed by a cell group configuration manager 825 as described with reference to FIG. 8. Additionally or alternatively, means for performing 1405 may, but not necessarily, include, for example, antenna 925, transceiver 915, communications manager 920, memory 930 (including code 935), processor 940 and/or bus 945.

At 1410, the method may include receiving control signaling that indicates an activation status for one or more of the set of multiple cells in the cell group, an indication of an operative role for each of the set of multiple cells in the cell group from among the set of candidate roles, or a combination thereof. The operations of 1410 may be performed in accordance with examples as disclosed herein. In some examples, aspects of the operations of 1410 may be performed by a control signaling manager 830 as described with reference to FIG. 8. Additionally or alternatively, means for performing 1410 may, but not necessarily, include, for example, antenna 925, transceiver 915, communications manager 920, memory 930 (including code 935), processor 940 and/or bus 945.

At 1415, the method may include performing wireless communications with the set of multiple cells in the cell group according to the operative roles for the set of multiple cells in the cell group in the mTRP deployment. The operations of 1415 may be performed in accordance with examples as disclosed herein. In some examples, aspects of the operations of 1415 may be performed by an operative role manager 835 as described with reference to FIG. 8. Additionally or alternatively, means for performing 1415 may, but not necessarily, include, for example, antenna 925, transceiver 915, communications manager 920, memory 930 (including code 935), processor 940 and/or bus 945.

Figure 15:
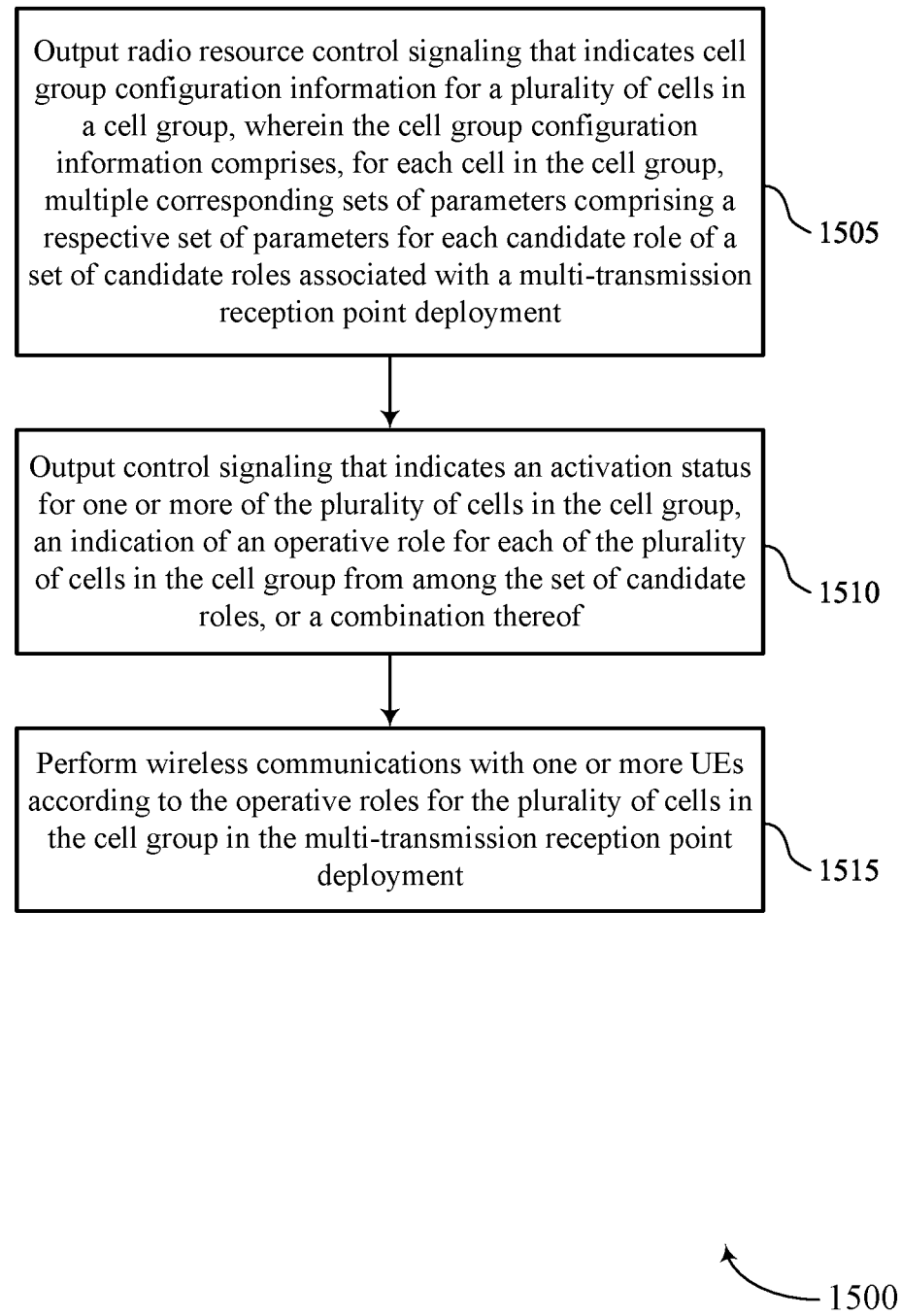

FIG. 15 shows a flowchart illustrating a method 1500 that supports group configuration for inter-cell mobility in mTRP deployments in accordance with one or more aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include outputting RRC signaling that indicates cell group configuration information for a set of multiple cells in a cell group, where the cell group configuration information includes, for each cell in the cell group, multiple corresponding sets of parameters including a respective set of parameters for each candidate role of a set of candidate roles associated with a mTRP deployment. The operations of 1505 may be performed in accordance with examples as disclosed herein. In some examples, aspects of the operations of 1505 may be performed by a cell group configuration manager 1225 as described with reference to FIG. 12. Additionally or alternatively, means for performing 1505 may, but not necessarily, include, for example, antenna 1315, transceiver 1310, communications manager 1320, memory 1325 (including code 1330), processor 1335 and/or bus 1340.

At 1510, the method may include outputting control signaling that indicates an activation status for one or more of the set of multiple cells in the cell group, an indication of an operative role for each of the set of multiple cells in the cell group from among the set of candidate roles, or a combination thereof. The operations of 1510 may be performed in accordance with examples as disclosed herein. In some examples, aspects of the operations of 1510 may be performed by a control signaling manager 1230 as described with reference to FIG. 12. Additionally or alternatively, means for performing 1510 may, but not necessarily, include, for example, antenna 1315, transceiver 1310, communications manager 1320, memory 1325 (including code 1330), processor 1335 and/or bus 1340.

At 1515, the method may include performing wireless communications with one or more UEs according to the operative roles for the set of multiple cells in the cell group in the mTRP deployment. The operations of 1515 may be performed in accordance with examples as disclosed herein. In some examples, aspects of the operations of 1515 may be performed by an operative role manager 1235 as described with reference to FIG. 12. Additionally or alternatively, means for performing 1515 may, but not necessarily, include, for example, antenna 1315, transceiver 1310, communications manager 1320, memory 1325 (including code 1330), processor 1335 and/or bus 1340.

The following provides an overview of aspects of the present disclosure:

Aspect 1: A method for wireless communications at a UE, comprising: receiving RRC signaling that indicates cell group configuration information for a plurality of cells in a cell group, wherein the cell group configuration information comprises multiple corresponding sets of parameters for each cell in the cell group, the multiple respective sets of parameters for a cell comprising a respective set of parameters for each candidate role of a set of candidate roles associated with a multi-TRP deployment; receiving control signaling that indicates an activation status for one or more of the plurality of cells in the cell group, an indication of an operative role for each of the plurality of cells in the cell group from among the set of candidate roles, or a combination thereof; and performing wireless communications with the plurality of cells in the cell group according to the operative roles for the plurality of cells in the cell group in the multi-TRP deployment.

Aspect 2: The method of aspect 1, further comprising: receiving, in the RRC signaling, second cell group configuration information for a second plurality of cells in a second cell group associated with a second serving cell, the second cell group configuration information comprising, for each cell in the second cell group, multiple corresponding sets of parameters comprising a respective set of parameters for each candidate role of the set of candidate roles associated with the multi-TRP deployment.

Aspect 3: The method of aspect 2, further comprising: transmitting capability information indicating that the UE is capable of supporting a plurality of cell groups, wherein receiving the cell group configuration information for the plurality of cells in the cell group and receiving the cell group configuration information for the second plurality of cells in the second cell group is based at least in part on transmitting the capability information.

Aspect 4: The method of any of aspects 1 through 3, further comprising: receiving, in the control signaling, an instruction to switch from communicating with a second cell group comprising a second plurality of cells to communicating with the plurality of cells in the cell group, wherein performing wireless communications with the plurality of cells in the cell group is based at least in part on receiving the instruction to switch.

Aspect 5: The method of any of aspects 1 through 4, wherein the cell group configuration information comprising, for each cell in the cell group, multiple corresponding sets of parameters comprises: a first plurality of sets of parameters for a first cell of the plurality of cells; and a set of offsets associated with the first plurality of sets of parameters, wherein a second plurality of sets of parameters for a second cell of the plurality of cells is based at least in part on application of the set of offsets to the first plurality of sets of parameters.

Aspect 6: The method of any of aspects 1 through 5, further comprising: receiving RRC signaling that removes the cell group from a plurality of cell groups comprising at least one active cell group and at least one inactive cell group.

Aspect 7: The method of any of aspects 1 through 6, wherein, for each cell in the cell group, the respective set of parameters for each candidate role of the set of candidate roles comprises: a first set of parameters for a first candidate role comprising a primary TRP role; and a second set of parameters for a second candidate role comprising a secondary TRP role.

Aspect 8: The method of any of aspects 1 through 7, wherein each cell of the plurality of cells is associated with a TRP of a plurality of TRPs.

Aspect 9: The method of any of aspects 1 through 8, wherein receiving the control signaling comprises: receiving a DCI message or a MAC-CE that indicates an activation status for one or more of the plurality of cells in the cell group, an indication of an operative role for each of the plurality of cells in the cell group from among the set of candidate roles, or a combination thereof.

Aspect 10: A method for wireless communications at one or more network entities, comprising: outputting RRC signaling that indicates cell group configuration information for a plurality of cells in a cell group, wherein the cell group configuration information comprises, for each cell in the cell group, multiple corresponding sets of parameters comprising a respective set of parameters for each candidate role of a set of candidate roles associated with a multi-TRP deployment; outputting control signaling that indicates an activation status for one or more of the plurality of cells in the cell group, an indication of an operative role for each of the plurality of cells in the cell group from among the set of candidate roles, or a combination thereof; and performing wireless communications with one or more UEs according to the operative roles for the plurality of cells in the cell group in the multi-TRP deployment.

Aspect 11: The method of aspect 10, further comprising: outputting, in the RRC signaling, second cell group configuration information for a second plurality of cells in a second cell group associated with a second serving cell, the second cell group configuration information comprising, for each cell in the second cell group, multiple corresponding sets of parameters comprising a respective set of parameters for each candidate role of the set of candidate roles associated with the multi-TRP deployment.

Aspect 12: The method of aspect 11, further comprising: obtaining capability information indicating that a UE of the one or more UEs is capable of supporting a plurality of cell groups, wherein outputting the cell group configuration information for the plurality of cells in the cell group and outputting the cell group configuration information for the second plurality of cells in the second cell group is based at least in part on transmitting the capability information.

Aspect 13: The method of any of aspects 10 through 12, further comprising: outputting, in the control signaling, an instruction to switch from communicating with a second cell group comprising a second plurality of cells to communicating with the plurality of cells in the cell group, wherein performing wireless communications with the one or more UEs is based at least in part on receiving the instruction to switch.

Aspect 14: The method of any of aspects 10 through 13, wherein the cell group configuration information comprising, for each cell in the cell group, multiple corresponding sets of parameters comprises: a first plurality of sets of parameters for a first cell of the plurality of cells; and a set of offsets associated with the first plurality of sets of parameters, wherein a second plurality of sets of parameters for a second cell of the plurality of cells is based at least in part on application of the set of offsets to the first plurality of sets of parameters.

Aspect 15: The method of any of aspects 10 through 14, further comprising: outputting RRC signaling that removes the cell group from a plurality of cell groups comprising at least one active cell group and at least one inactive cell group.

Aspect 16: The method of any of aspects 10 through 15, wherein, for each cell in the cell group, the respective set of parameters for each candidate role of the set of candidate roles comprises: a first set of parameters for a first candidate role comprising a primary TRP role; and a second set of parameters for a second candidate role comprising a secondary TRP.

Aspect 17: The method of any of aspects 10 through 16, wherein each cell of the plurality of cells is associated with a TRP of a plurality of TRPs.

Aspect 18: The method of any of aspects 10 through 17, wherein outputting the control signaling comprises: outputting a DCI message or a MAC-CE that indicates an activation status for one or more of the plurality of cells in the cell group, an indication of an operative role for each of the plurality of cells in the cell group from among the set of candidate roles, or a combination thereof.

Aspect 19: An apparatus for wireless communications at a UE, comprising memory, a transceiver, and at least one processor coupled with the memory and the transceiver, the at least one processor configured to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at one or more network entities, comprising memory and at least one processor coupled with the memory, the at least one processor configured to perform a method of any of aspects 10 through 18.

Aspect 23: An apparatus for wireless communications at one or more network entities, comprising at least one means for performing a method of any of aspects 10 through 18.

Aspect 24: A non-transitory computer-readable medium storing code for wireless communications at one or more network entities, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving radio resource control signaling that indicates cell group configuration information for a plurality of cells in a cell group, wherein the cell group configuration information comprises multiple corresponding sets of parameters for each cell in the cell group, the multiple respective sets of parameters for a cell comprising a respective set of parameters for each candidate role of a set of candidate roles associated with a multi-transmission reception point deployment;
   receiving control signaling that indicates an activation status for one or more of the plurality of cells in the cell group, an indication of an operative role for each of the plurality of cells in the cell group from among the set of candidate roles, or a combination thereof; and
   performing wireless communications with the plurality of cells in the cell group according to the operative roles for the plurality of cells in the cell group in the multi-transmission reception point deployment.

2. The method of claim 1, further comprising:
   receiving, in the radio resource control signaling, second cell group configuration information for a second plurality of cells in a second cell group associated with a second serving cell, the second cell group configuration information comprising, for each cell in the second cell group, multiple corresponding sets of parameters comprising a respective set of parameters for each candidate role of the set of candidate roles associated with the multi-transmission reception point deployment.

3. The method of claim 2, further comprising:
   transmitting capability information indicating that the UE is capable of supporting a plurality of cell groups, wherein receiving the cell group configuration information for the plurality of cells in the cell group and receiving the cell group configuration information for the second plurality of cells in the second cell group is based at least in part on transmitting the capability information.

4. The method of claim 1, further comprising:
   receiving, in the control signaling, an instruction to switch from communicating with a second cell group comprising a second plurality of cells to communicating with the plurality of cells in the cell group, wherein performing wireless communications with the plurality of cells in the cell group is based at least in part on receiving the instruction to switch.

5. The method of claim 1, wherein the cell group configuration information comprising, for each cell in the cell group, multiple corresponding sets of parameters comprises:
   a first plurality of sets of parameters for a first cell of the plurality of cells; and
   a set of offsets associated with the first plurality of sets of parameters, wherein a second plurality of sets of parameters for a second cell of the plurality of cells is based at least in part on application of the set of offsets to the first plurality of sets of parameters.

6. The method of claim 1, further comprising:
   receiving radio resource control signaling that removes the cell group from a plurality of cell groups comprising at least one active cell group and at least one inactive cell group.

7. The method of claim 1, wherein, for each cell in the cell group, the respective set of parameters for each candidate role of the set of candidate roles comprises:
   a first set of parameters for a first candidate role comprising a primary transmission reception point role; and
   a second set of parameters for a second candidate role comprising a secondary transmission reception point role.

8. The method of claim 1, wherein each cell of the plurality of cells is associated with a transmission reception point of a plurality of transmission reception points.

9. The method of claim 1, wherein receiving the control signaling comprises:
   receiving a downlink control information message or a media access control control element that indicates an activation status for one or more of the plurality of cells in the cell group, an indication of an operative role for each of the plurality of cells in the cell group from among the set of candidate roles, or a combination thereof.

10. A method for wireless communications at one or more network entities, comprising:
    outputting radio resource control signaling that indicates cell group configuration information for a plurality of cells in a cell group, wherein the cell group configuration information comprises, for each cell in the cell group, multiple corresponding sets of parameters comprising a respective set of parameters for each candidate role of a set of candidate roles associated with a multi-transmission reception point deployment;
    outputting control signaling that indicates an activation status for one or more of the plurality of cells in the cell group, an indication of an operative role for each of the plurality of cells in the cell group from among the set of candidate roles, or a combination thereof; and
    performing wireless communications with one or more UEs according to the operative roles for the plurality of cells in the cell group in the multi-transmission reception point deployment.

11. The method of claim 10, further comprising:
outputting, in the radio resource control signaling, second cell group configuration information for a second plurality of cells in a second cell group associated with a second serving cell, the second cell group configuration information comprising, for each cell in the second cell group, multiple corresponding sets of parameters comprising a respective set of parameters for each candidate role of the set of candidate roles associated with the multi-transmission reception point deployment.

12. The method of claim 11, further comprising:
obtaining capability information indicating that a UE of the one or more UEs is capable of supporting a plurality of cell groups, wherein outputting the cell group configuration information for the plurality of cells in the cell group and outputting the cell group configuration information for the second plurality of cells in the second cell group is based at least in part on transmitting the capability information.

13. The method of claim 10, further comprising:
outputting, in the control signaling, an instruction to switch from communicating with a second cell group comprising a second plurality of cells to communicating with the plurality of cells in the cell group, wherein performing wireless communications with the one or more UEs is based at least in part on receiving the instruction to switch.

14. The method of claim 10, wherein the cell group configuration information comprising, for each cell in the cell group, multiple corresponding sets of parameters comprises:
a first plurality of sets of parameters for a first cell of the plurality of cells; and
a set of offsets associated with the first plurality of sets of parameters, wherein a second plurality of sets of parameters for a second cell of the plurality of cells is based at least in part on application of the set of offsets to the first plurality of sets of parameters.

15. The method of claim 10, further comprising:
outputting radio resource control signaling that removes the cell group from a plurality of cell groups comprising at least one active cell group and at least one inactive cell group.

16. The method of claim 10, wherein, for each cell in the cell group, the respective set of parameters for each candidate role of the set of candidate roles comprises:
a first set of parameters for a first candidate role comprising a primary transmission reception point role; and
a second set of parameters for a second candidate role comprising a secondary transmission reception point.

17. The method of claim 10, wherein each cell of the plurality of cells is associated with a transmission reception point of a plurality of transmission reception points.

18. The method of claim 10, wherein outputting the control signaling comprises:
outputting a downlink control information message or a media access control control element that indicates an activation status for one or more of the plurality of cells in the cell group, an indication of an operative role for each of the plurality of cells in the cell group from among the set of candidate roles, or a combination thereof.

19. An apparatus for wireless communications, comprising:
memory;
a transceiver; and
at least one processor of a user equipment (UE), the at least one processor configured to cause the apparatus to:
receive, via the transceiver, radio resource control signaling that indicates cell group configuration information for a plurality of cells in a cell group, wherein the cell group configuration information comprises multiple corresponding sets of parameters for each cell in the cell group, the multiple respective sets of parameters for a cell comprising a respective set of parameters for each candidate role of a set of candidate roles associated with a multi-transmission reception point deployment;
receive, via the transceiver, control signaling that indicates an activation status for one or more of the plurality of cells in the cell group, an indication of an operative role for each of the plurality of cells in the cell group from among the set of candidate roles, or a combination thereof; and
perform, via the transceiver, wireless communications with the plurality of cells in the cell group according to the operative roles for the plurality of cells in the cell group in the multi-transmission reception point deployment.

20. The apparatus of claim 19, the at least one processor further configured to cause the apparatus to:
receive, via the transceiver and the radio resource control signaling, second cell group configuration information for a second plurality of cells in a second cell group associated with a second serving cell, the second cell group configuration information comprising, for each cell in the second cell group, multiple corresponding sets of parameters comprising a respective set of parameters for each candidate role of the set of candidate roles associated with the multi-transmission reception point deployment.

* * * * *